(12) United States Patent
Zeng

(10) Patent No.: US 8,327,423 B2
(45) Date of Patent: Dec. 4, 2012

(54) METHOD AND APPARATUS FOR DISTRIBUTED AUTHORIZATION BY ANONYMOUS FLEXIBLE CREDENTIAL

(75) Inventor: Ke Zeng, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 1069 days.

(21) Appl. No.: 12/147,057

(22) Filed: Jun. 26, 2008

(65) Prior Publication Data

US 2009/0037990 A1     Feb. 5, 2009

(30) Foreign Application Priority Data

Jun. 27, 2007   (CN) .......................... 2007 1 0122707

(51) Int. Cl.
*H04L 29/06*   (2006.01)
(52) U.S. Cl. ........................... 726/6; 713/157; 713/175
(58) Field of Classification Search .............. 726/2, 4–7, 726/26–30; 713/168, 182; 380/282; 709/225, 709/229; 705/74
See application file for complete search history.

(56) References Cited

U.S. PATENT DOCUMENTS

| | | | | |
|---|---|---|---|---|
| 7,716,492 | B1 * | 5/2010 | Saulpaugh et al. | 713/185 |
| 2003/0177352 | A1 * | 9/2003 | Camenisch et al. | 713/158 |
| 2004/0098609 | A1 * | 5/2004 | Bracewell et al. | 713/200 |
| 2005/0066191 | A1 * | 3/2005 | Thibadeau | 713/200 |
| 2005/0102534 | A1 * | 5/2005 | Wong | 713/201 |

OTHER PUBLICATIONS

Communication dated Jul. 26, 2011 from the State Intellectual Property Office of P.R. China in a counterpart application No. 200710122707.X.

* cited by examiner

*Primary Examiner* — Gilberto Barron, Jr.
*Assistant Examiner* — David Le
(74) *Attorney, Agent, or Firm* — Sughrue Mion, PLLC

(57) ABSTRACT

A method and apparatus for distributed authorization by anonymous flexible credential are provided. Pseudonym authority issues a root pseudonym to a user. The user may generate large amount of derived pseudonym from the root pseudonym. The user may obtain resource credentials from resource protectors by using derived pseudonyms. The user may select a set of resource credentials, generate a flexible credential from this set of resource credentials and request access to the resource corresponding to the set of resource credentials to a resource protector by using the flexible credential and a derived pseudonym. Revocation list for each resource may be maintained in the system such that any one of resource credentials of any user may be revoked without affecting other resource credentials of that user.

34 Claims, 10 Drawing Sheets

METHOD AND APPARATUS FOR DISTRIBUTED AUTHORIZATION BY ANONYMOUS FLEXIBLE CREDENTIAL

FIELD OF THE INVENTION

The invention relates generally to computer communication network security, and more particularly to a communication method, system and apparatus for distributed authorization with capability of preserving privacy.

BACKGROUND

With the proliferation of various computer communication networks, over which diverse applications have been launched, the protection of consumer privacy in authorization based applications is a challenge that can be postponed no longer.

Logically, authorization is preceded by authentication because authentication ensures that a user is who he/she claims to be while authorization allows the user access to various services based on the user's identity. Current industrial practice such as Access Control List (ACL) implements authorization by retrieving user's credentials from a local database and then checking that user's credentials satisfy given access control policy associated with the resource. Since disclosing user's unique identity to resource protector is necessary so as to retrieve the user's credentials, such practice achieves secure authorization at the cost of user privacy.

As illustrated in FIG. 16, an authorization system has, as types of parties, Pseudonym Authority (PA), user, Resource Holder (RH), and Resource Protector (RP). PA is, for example, a server or the like coupled to a network and managing the use of pseudonyms in the system. RH is for example a workstation having content data, computation resources, and the like thereon, or a server providing certain services and so on, which is coupled to the network. RP is, for example, a login server or the like coupled to the network and controlling the access to the resources. A user may access the resource by using a pseudonym with, for example, a personal computer (PC) or a terminal coupled to the network.

PA serves as trusted third party that is capable of granting a pseudonym to the user, tracing a suspicious user, and revoking a misbehaving user.

RH manages several resources and grants access rights, i.e. credentials, to the user.

RP guards resources and verifies credentials of the user. It should be noted that a user may demonstrate credentials issued by different RHs to a RP, which is a common practice of authorization system. To illustrate, if a user is both gold customer of Company A (with a credential from a first RH) and Company B (with a credential from a second RH), then he is given with gold member's access right on resources of Company C (by RP for a third RH).

It's desirable to realize a high-privacy authorization system having any of the following characteristics:

(1) Unlinkable Anonymity. It's hard for the RH(s) to ascertain the identity of the user after multiple interactions between the user and the RH(s). Moreover, it's hard for the RP(s) to ascertain the identity of the user after multiple interactions between the user and the RP(s).

(2) Scalability. A user anonymously demonstrates credential(s) to a RP and convinces the RP without involving a third party online. In particular, it doesn't get the RH(s) to reissue credentials for each interaction between the user and the RP(s).

(3) Fine-Grained Anonymity. Instead of always demonstrating the entire credentials to RP(s), the user is able to select any portion of his credentials to demonstrate to the RP(s).

(4) Fine-Grained Revocability. Revocation of credential(s) may take place at a per-user and per-right basis. Any access right of a user, i.e. any credential of the user, could be revoked without affecting other credentials of the user.

(5) Constant Expensive Computation. When Fine-Grained Anonymity is achieved, the amount of expensive cryptographic computations is independent of the number of credentials selected to demonstrate. For instance, scalar multiplication, modular exponentiation, and pairing evaluation are in general considered expensive. Moreover, when Fine-Grained Revocability is achieved, the amount of expensive cryptographic computations is independent of the number of credentials selected in verifying the revocation.

(6) Expandability. In case the authorization system expands to accommodate a new RH or an existing RH expands to manage a new resource, there is no need to alter credentials the users already hold. In particular, re-issuance of any issued credential should be avoided.

It is first introduced in D. Chaum, J. H. Evertst, *A Secure and Privacy-protecting Protocol for Transmitting Personal Information Between Organizations*, in Proc. of Advances in Cryptology—Crypto '86, LNCS vol. 263, pp. 118-167, 1986, a scenario with multiple users that request credentials from resource holders and anonymously demonstrate credentials to resource protectors. In this paper and those followed, the term "organization" was used to represent a logical combination of resource holders and resource protectors.

The scheme proposed by Chaum et al is based on having a trusted third party involved in all interactions. Later schemes proposed by Chen (see L. Chen, *Access with Pseudonyms*, In Proc. of International Conference on Cryptography: Policy and Algorithms, LNCS vol. 1029, pp. 232-243, 1995) and Lysyanskaya et al. (see A. Lysyanskaya, R. Rivest, A. Sahai, S. Wolf, *Pseudonym Systems*. In Proc. of Selected Areas in Cryptography, LNCS vol. 1758, pp. 184-199, 1999) rely on trusted third party involved in all interactions as well. In order to be unlinkable, getting the resource holder to reissue credentials for each interaction between the user and the resource protector is inevitable. Hence these anonymous credential schemes are not scalable.

In addition, Camenisch et al. also proposed two anonymous credential schemes (see J. Camenisch, A. Lysyanskaya, *An Efficient System for Non-transferable Anonymous Credentials with Optional Anonymity Revocation*, In Proc. of Advances in Cryptology-EuroCrypto'01, LNCS vol. 2045, pp. 93-118, 2001, and J. Camenisch, A. Lysyanskaya. *Signature Schemes and Anonymous Credentials from Bilinear Maps*, In Proc. of Advances in Cryptology-Crypto'04, LNCS vol. 3152, pp. 56-72, 2004), which achieve unlinkable anonymity and scalability.

However, with the above-mentioned traditional schemes, the resources a resource holder can manage are determined by some parameters inside the resource holder's public key. Any modification to the parameters inevitably leads to refreshing credentials already issued. Therefore, expandability is not achieved.

And, with the traditional schemes, either the user credentials are bind together by the RH and the user has to demonstrate the entire credentials to RP, or the amount of expensive cryptographic computations goes linear with the number of credentials demonstrated. Thus, none achieves fine-grained anonymity and constant expensive computation.

In addition, with the traditional schemes, the only way for revoking one access right of a user is to revoke the entire access rights of the user, that is, invalidate all the credentials of the user and then reissue new credentials to the user, as shown in FIG. 17. Thus, none achieves fine-grained revocability.

SUMMARY OF THE INVENTION

The present invention is made in view of the above problems.

According to one aspect of the invention, a method for a communication system is provided, comprising: issuing a root pseudonym; acquiring one or more resource credentials; generating a first derived pseudonym from the root pseudonym; selecting a set of resource credentials from said one or more resource credentials; generating a flexible credential from the set of resource credentials; making a request for an access by using the first derived pseudonym and the flexible credential; and granting the request for an access after verifying the first derived pseudonym and the flexible credential.

According to another aspect of the invention, an apparatus for managing pseudonyms in a communication system is provided, comprising: a system parameter setup unit configured to set up system parameters; an identity verification unit configured to perform user identity verification; a user pseudonym key assigning unit configured to assign user pseudonym keys for users; and a root pseudonym generating unit configured to generate root pseudonyms to be issued to the users based on the user pseudonym keys.

According to another aspect of the invention, a method for managing pseudonyms in a communication system is provided, comprising: verifying a user identity when a user's request from a user terminal is received; assigning a user pseudonym key for the user if the user identity passes the verification; and generating a root pseudonym based on the user pseudonym key.

According to another aspect of the invention, an apparatus for managing credentials for one or more resources in a communication system is provided, comprising: a resource key generating unit configured to generate a resource private key and a resource public key for each resource; a pseudonym verification unit configured to verify a derived pseudonym of a user; and a credential information generating unit configured to generate, based on the derived pseudonym of the user, credential information for a resource which is to be sent to a user terminal of the user.

According to another aspect of the invention, a method for managing credentials for one or more resources in a communication system is provided, comprising: generating a resource private key and a resource public key for each resource; verifying a derived pseudonym of a user when a user's request from a user terminal is received; and generating, based on the derived pseudonym, credential information for a resource which is to be sent to the user terminal if the verification is passed.

According to another aspect of the invention, a user terminal in a communication system is provided, comprising: a root pseudonym acquiring unit configured to acquire a root pseudonym; a resource credential acquiring unit configured to acquire one or more resource credentials; a derived pseudonym generating unit configured to generate a first derived pseudonym from the root pseudonym; and a flexible credential generating unit configured to generate a flexible credential from a selected set of resource credentials, wherein the user terminal acquires access to a set of resources corresponding to the set of resource credentials by using the first derived pseudonym and the flexible credential.

According to another aspect of the invention, a method for a user terminal in a communication system is provided, comprising: acquiring a root pseudonym; acquiring one or more resource credentials; generating a first derived pseudonym from the root pseudonym, and generating a flexible credential from a selected set of resource credentials; and acquiring access to a set of resources corresponding to the set of resource credentials by using the first derived pseudonym and the flexible credential.

According to another aspect of the invention, an apparatus for managing accesses to one or more resource in a communication system is provided, comprising: a pseudonym verification unit configured to verify a derived pseudonym of a user; a flexible credential verification unit configured to verify a flexible credential of the user; and an authorization unit configured to authorize the user to access a set of resources corresponding to the flexible credential based on the verification results of the pseudonym verification unit and the flexible credential verification unit.

According to another aspect of the invention, a method for managing accesses to one or more resource in a communication system, comprising: verifying a derived pseudonym of a user; verifying a flexible credential of the user; and authorizing the user to access a set of resources corresponding to the flexible credential based on the results of the verifications of the derived pseudonym and the flexible credential.

The invention also provides a manufactured article having a machine-readable medium which recorded thereon instructions for causing processors to perform the method according to the invention.

According to the solution of the invention, after a user is authorized, the user could remain anonymous no matter how many times the user demonstrates his/her credentials to the resource protectors, while further contacting resource holders is not needed. At the same time, the number of RHs PA can accommodate is variable after the public key of PA is determined and published. Also, the number of resources a resource holder can manage is not fixed after the public key of the resource holder is determined and published while change of the credentials having being issued is not needed.

In addition, a user can selectively demonstrate to a resource protector any portion of the full set of his/her access rights. And, the computational cost for the user to prove any portion of the access rights is independent of the number of rights to be proved (the same as that for proving only one right).

In addition, the pseudonym authority can revoke any one of the resource credentials of a user without altering other rights of the user. And, the pseudonym authority can do the revocation without involvement of the resource holder, or in other words, fine-grained revocation is achieved without entailing secret key of resource holder. The amount of expensive computations required for verifying whether arbitrary number of resource credentials are revoked is constant, that is, the same as that for verifying whether a single resource credential is revoked.

From the following detailed description in conjunction with the drawings, other features and merits of the invention will be apparent. It should be noted that the invention is never limited to the examples shown in the drawings or any specific embodiment.

BRIEF DESCRIPTION OF THE DRAWINGS

The present invention will be better understood from the following detailed description of the preferred embodiments of the invention, taken in conjunction with the accompanying drawings in which like reference signs refer to like parts and in which.

DESCRIPTION OF THE PREFERRED EMBODIMENTS

Figure 1:
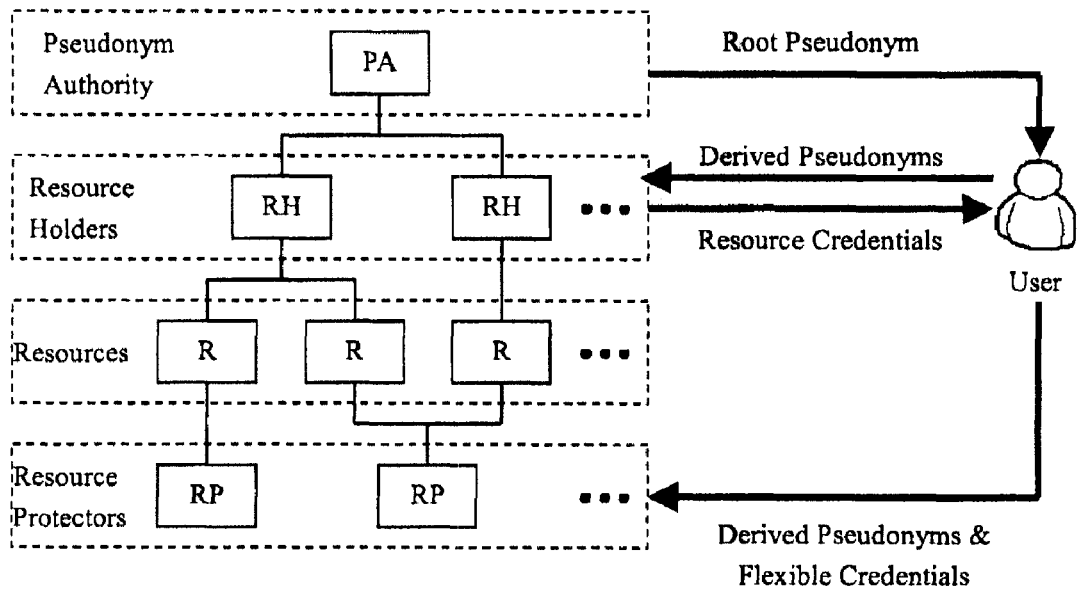
FIG. 1 is a diagram schematically illustrating a general concept of the solution according to the invention.

FIG. 1 schematically illustrates the general concept of the solution according to the invention. As shown in FIG. 1, a pseudonym authority PA issues a root pseudonym to a user and the user acquires resource credentials from resource holders RHs by using derived pseudonyms computed from the root pseudonym by the user itself. When the user wants to access one or more resources, the user selects, from all the resource credentials which he/she has, a set of resource credentials which correspond to the resources desired to access, and generates a special credential by this set of resource credentials. Such credential may be generated based on any selected resource credentials by the user, and hereinafter is referred to as flexible credential. After that, the user demonstrates the generated flexible credential as well as the derived pseudonym computed from the root pseudonym to a resource protector RP, and after being verified by the resource protector RP, gains the access to the desired resources.

According to the solution of the invention, the user may generate from a root pseudonym a large number of derived pseudonyms, which are different from each other. And in each interaction with a resource protector, the user may use a different derived pseudonym without the need of multiple requests to the pseudonym authority.

Figure 2:
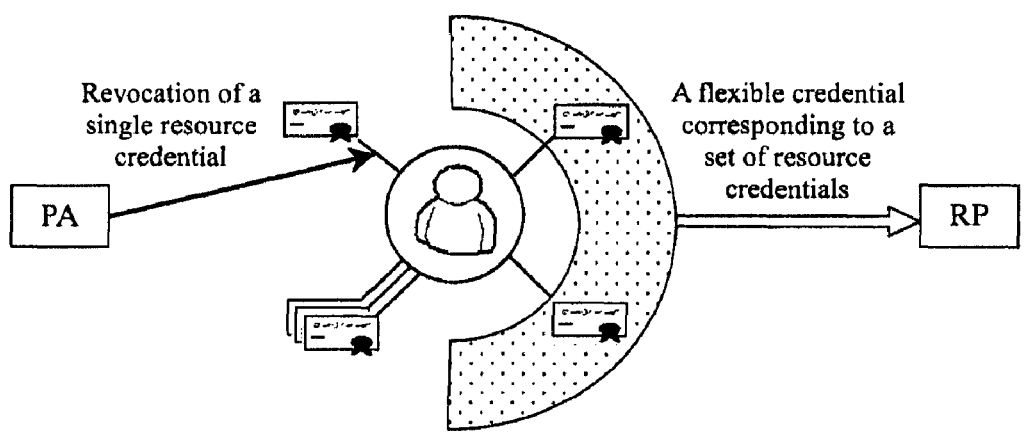
FIG. 2 is a schematic diagram illustrating the use and revocation of credentials according to the invention.

FIG. 2 is a schematic diagram illustrating the use and revocation of the credentials according to the solution of the invention. As shown in FIG. 2, the user may select a part of resource credentials, generate therefrom a flexible credential, and send the flexible credential to the resource protector for verification, which is different from the traditional schemes where all the resource credentials are demonstrated to the resource protector. In addition, with such flexible credential, the verification is merely performed between the user and the resource protector while the pseudonym authority or the resource holders are not involved in. In addition, the pseudonym authority PA according to the invention is capable of revoking the resource credential(s) of the user. Further, the pseudonym authority PA may maintain a revocation list so as to realize fine-grained revocation, that is, only one or more resource credentials of the user are revoked while other resource credentials are not affected.

The illustrative embodiments of the invention will be described below with reference to the drawings. It should be noted that the embodiments are described merely for illustration purpose and the invention is note limited to any particular embodiment described.

First Embodiment

In the following description, traditional multiplicative group notations are used as an example. However, those skilled in the art may appreciate that the additive notations often used in elliptic curve settings may be similarly employed.

Let $\mathbb{G}_1 = \langle g_1 \rangle$ and $\mathbb{G}_2 = \langle g_2 \rangle$ and additional group $\mathcal{G} = \langle g \rangle$ be finite cyclic groups such that $|\mathbb{G}_1|=|\mathbb{G}_2|=|\mathcal{G}|=p$, where p is some large prime. Bilinear map e: $\mathbb{G}_1 \times \mathbb{G}_2 \rightarrow \mathcal{G}$ (see D. Boneh, M. Franklin, *Identity-Based Encryption from the Weil Pairing*, Proc. Ctypto'01, LNCS, vol. 2139, pp. 213-229, 2001; S. Galbraith, K. Harrison, D. Soldera, *Implementing the Tate pairing*, Proc. of the 5th International Symposium on Algorithmic Number Theory, LNCS 2369, 324-337, 2002; and A. Miyaji, M. Nakabayashi, S. Takano, *New Explicit Conditions of Elliptic Curves for FR-reduction*, IEICE Trans. Fundamentals, E84-A(5): 1234-1243, 2001) is a function, which satisfies the followings:

i. bilinear: for all $h_1 \in \mathbb{G}_1$, $h_2 \in \mathbb{G}_2$ and for all a, b$\in \mathbb{Z}_p$, there is $e(h_1^a, h_2^b) = e(h_1, h_2)^{ab}$;

ii. non-degenerate: $\exists h_1 \in \mathbb{G}_1$, $\exists h_2 \in \mathbb{G}_2$, such that $e(h_1, h_2) \neq I$, where I is the identify of $\mathcal{G}$; and iii. computable: there exists an efficient algorithm for computing e A setup algorithm Setup(•) is defined such that on input security parameter $1^k$, it outputs the above settings of bilinear map and is wrote as:

$$(p, \mathbb{G}_1, \mathbb{G}_2, \mathcal{G}, g_1, g_2, e) \leftarrow \text{Setup}(1^k).$$

where $1^k$ means that the security length of the system is selected as k bits.

Since $\mathbb{G}_1$, $\mathbb{G}_2$, and $\mathcal{G}$ are of the same prime order p, according to Bilinear property and Non-degenerate property it's easy to see that $e(g_1, g_2)=g$.

System Configuration

The communication system according to the invention includes a pseudonym authority PA, resource holders RHs, resource protectors RPs and users who want to access the resources, which are capable of communicating with each other.

Figure 3:
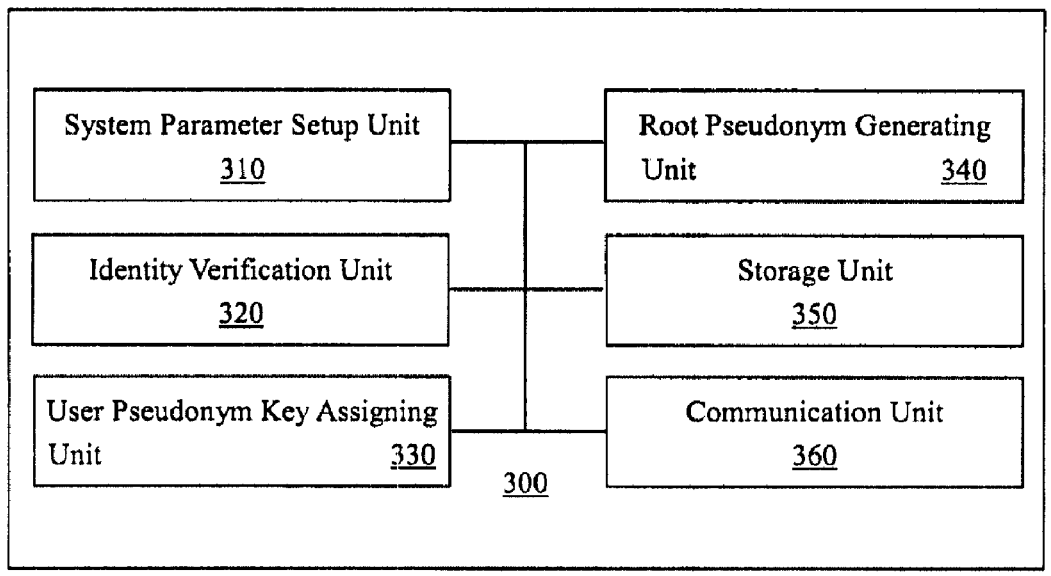
FIG. 3 is a block diagram illustrating an example of configuration of PA according to a first embodiment of the invention.

FIG. 3 illustrates an example of configuration of the pseudonym authority PA 300 according to the first embodiment of the invention. As shown in FIG. 3, PA 300 mainly comprises a system parameter setup unit 310 for setting up system parameters, an identity verification unit 320 for performing user identity verification, a user pseudonym key assigning unit 330 for assigning user pseudonym keys for users, a root pseudonym generating unit 340 for generating root pseudonyms for the users, a storage unit 350 for storing data necessary for the operation of PA, and a communication unit 360 for communicating with other devices in the system, which are coupled to each other.

Figure 4:
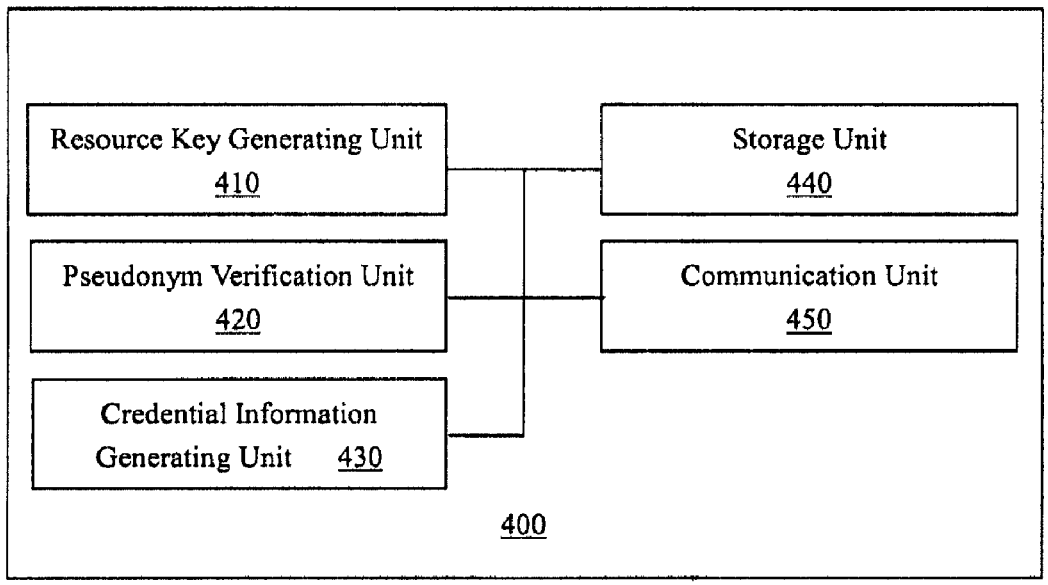
FIG. 4 is a block diagram illustrating an example of configuration of RH according to the first embodiment of the invention.

FIG. 4 illustrates an example of configuration of the resource holder RH 400 according to the first embodiment of the invention. As shown in FIG. 4, RH 400 mainly comprises a resource key generating unit 410 for selecting a resource private key and a resource public key for each resource, a pseudonym verification unit 420 for verifying a derived pseudonym of a user, a credential information generating unit 430 for generating credential information of a resource for a user based on the derived pseudonym of the user, a storage unit 440 for storing data necessary for the operation of RH, and a communication unit 450 for communicating with other devices in the system, which are coupled to each other.

Figure 5:
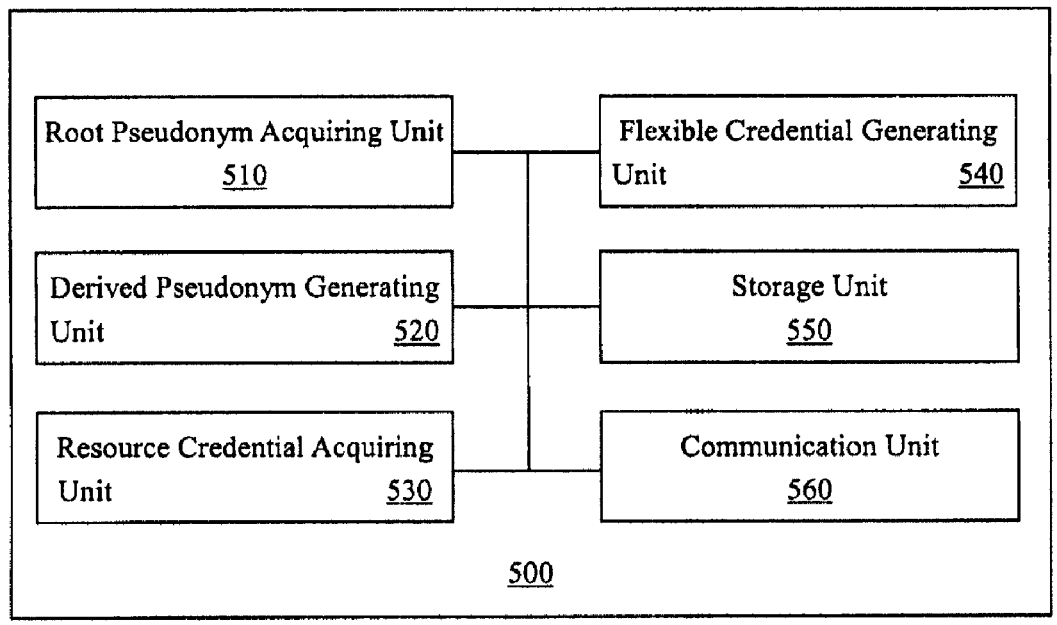
FIG. 5 is a block diagram illustrating an example of configuration of user terminal according to the first embodiment of the invention.

FIG. 5 illustrates an example of configuration of the user terminal 500 according to the first embodiment of the invention. As shown in FIG. 5, the user terminal 500 mainly comprises a root pseudonym acquiring unit 510 for acquiring a root pseudonym, a derived pseudonym generating unit 520 for generating derived pseudonyms from the root pseudonym, a resource credential acquiring unit 530 for acquiring resource credentials, a flexible credential generating unit 540 for generating a flexible credential from selected resource credentials, a storage unit 550 for storing data necessary for the operation of the user terminal 500, and a communication unit 560 for communicating with other devices in the system, which are coupled to each other.

Figure 6:
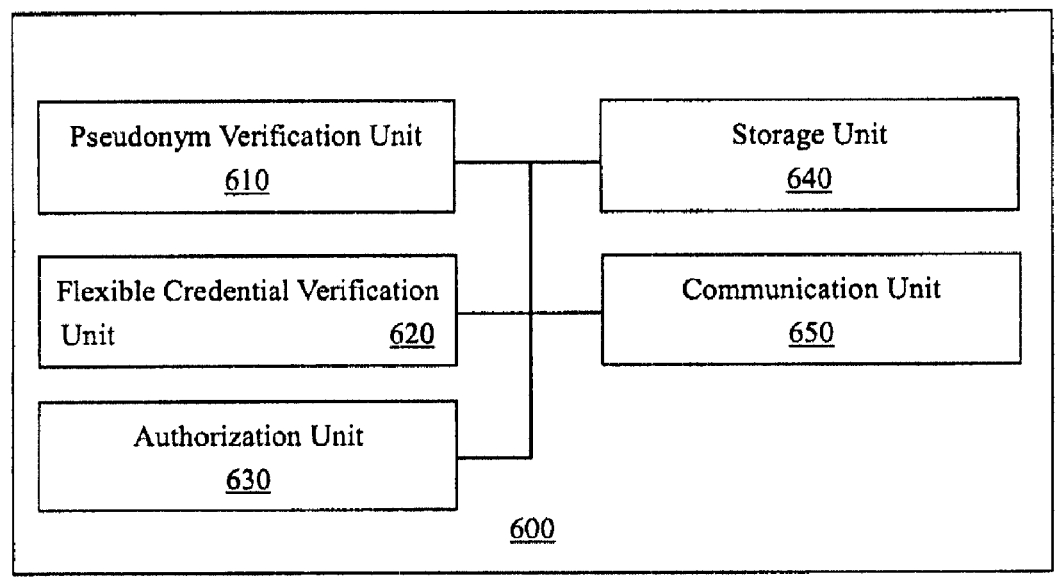
FIG. 6 is a block diagram illustrating an example of configuration of RP according to the first embodiment of the invention.

FIG. 6 illustrates an example of configuration of the resource protector RP 600 according to the first embodiment of the invention. As shown in FIG. 6, the resource protector RP 600 mainly comprises a pseudonym verification unit 610 for verifying a pseudonym of a user, a flexible credential verification unit 620 for verifying a flexible credential of a user, an authorization unit 630 for authorizing a user to access resources, a storage unit 640 for storing data necessary for the operation of the resource protector RP 600, and a communication unit 650 for communicating with other devices in the system, which are coupled to each other.

An example of the procedures according to the first embodiment of the invention is described below in detail.

Pseudonym Authority Setup

Figure 7:
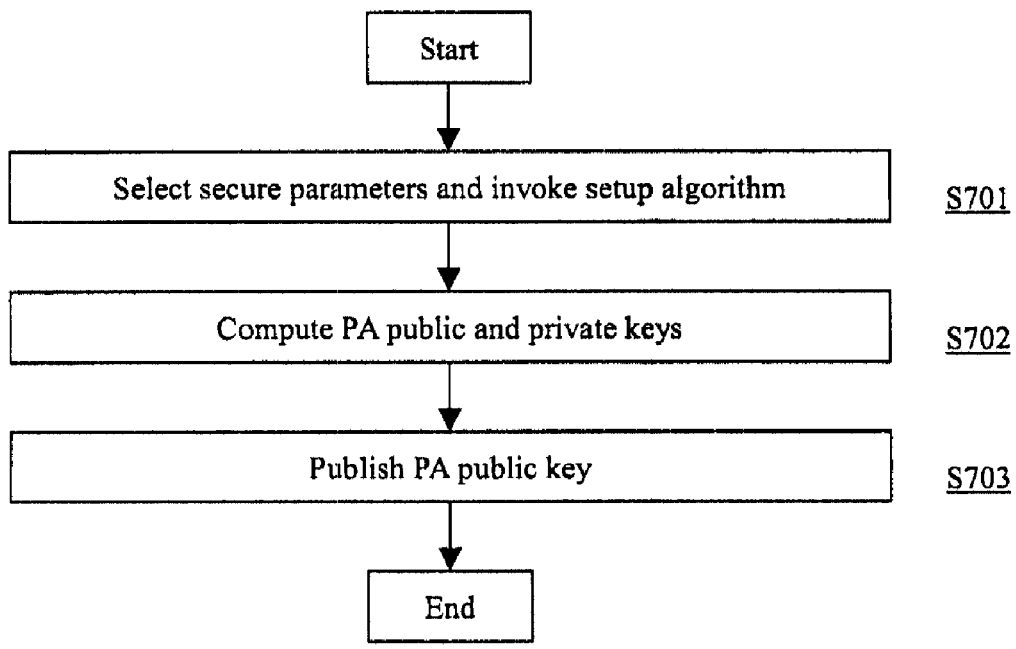
FIG. 7 is a flow chart illustrating the setup procedures of PA according to the first embodiment of the invention.

When the authorization system starts up, PA needs to determine security strength it desires, select underlying algebra, generate its private key, and publish public keys. FIG. 7 illustrates the particular procedures for PA to setup.

As shown in FIG. 7, at step S701, the system parameter setup unit 310 of PA determines the secure parameter $1^k$ according to the security length it desires, and invokes the setup algorithm $(p, \mathbb{G}_1, \mathbb{G}_2, \mathcal{G}, g_1, g_2, e) \leftarrow \text{Setup}(1^k)$.

At step S702, the system parameter setup unit 310 randomly selects an integer $a \in_R \mathbb{Z}_p^*$ as the private key of PA, and computes $A=g_2{}^a \in \mathbb{G}_2$.

At step S703, PA publishes its public key $PK^{PA}=(p, \mathbb{G}_1, \mathbb{G}_2, \mathcal{G}, g_1, g_2, e, A)$ via the communication unit 360.

Resource Holder Setup

Figure 8:
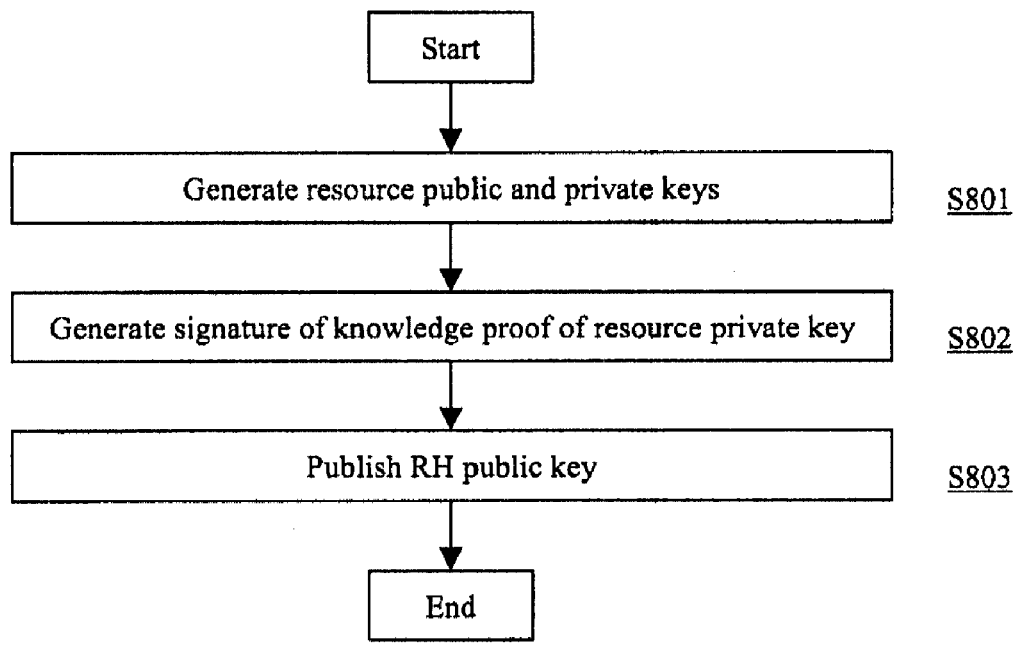
FIG. 8 is a flow chart illustrating the setup procedures of RH according to the first embodiment of the invention.

FIG. 8 illustrates the particular procedures for the resource holder to setup according to the first embodiment of the invention. As shown in FIG. 8, after getting the PA public key $PK^{PA}$, a resource holder $RH_i$ that manages resources $R_i{}^j$ (j=1, 2, ..., $n_i$) performs the following steps:

At step S801, the resource key generating unit 410 of $RH_i$ chooses for each $R_i{}^j$ an integer $b_i{}^j \in_R \mathbb{Z}_p^*$ as the resource private key of $R_i{}^j$, and computes a resource public key $B_i{}^j = g_2{}^{b_i{}^j} \in \mathbb{G}_2$ for each resource, j=1, 2, ..., $n_i$.

At step S802, the resource key generating unit 410 also generates, for each set of $B_i{}^j$, a signature of knowledge proof $$\Sigma_i{}^j = SKP\{(x_j):B_i{}^j=g_2{}^{x_j}\}, j=1,2,\ldots,n_i$$

by which $RH_i$ may prove knowledge of $b_i{}^j = \log_{g_2}^{B_i{}^j}$.

Here, the notation SKP denotes the so-called knowledge proof technique (see S. Goldwasser, S. Micali, C. Rackoff, *The Knowledge Complexity of Interactive Proof Systems*, 17$^{th}$ ACM Symposium on Theory of Computation, pp. 291-304, 1985, which is incorporated herein by reference). Many methods have been proposed to prove the knowledge of discrete logarithm in zero-knowledge (see A. Fiat, A. Shamir, *How To Prove Yourself: Practical Solutions to Identification and Signature Problems*, Advances in Cryptology-CRYPTO'86, pp. 186-194, 1986; D. Chaum, *Demonstrating Possession of a Discrete Logarithm without Revealing It*, Advances in Cryptology—CRYPTO'86, pp. 200-212, 1987; D. Chaum, J. H. Evertse, J. van de Graaf, *An Improved Protocol for Demonstrating Possession of Discrete Logarithms and Some Generalizations*, Advances in Cryptology—EUROCRYPTO'87, pp. 127-141, 1987; D. Chaum, T. P. Pedersen, *Wallet Databases with Observers*, Advances in Cryptology—CRYPTO'92, pp. 89-105, 1993; K. Sako, J. Kilian, *Receipt-Free Mix-Type Voting Scheme—A Practical Solution to the Implementation of a Voting Booth*, Advances in Cryptology—CRYPTO'98, pp. 393-403, 1998; and Ke Zeng, *Pseudonymous PKI for Ubiquitous Computing*, LNCS 4043, pp. 207-222, EuroPKI'06, 2006, which provide particular example of computation and implementation of knowledge proof step by step and are incorporated herein by reference). For example, $SKP\{(x_j):B_i{}^j=g_2{}^{x_j}\}$ denotes that the resource holder $RH_i$ may prove that it knows $x_j$ such that $B_i{}^j=g_2{}^{x_j}$ without revealing information of $x_j$ in the computation.

Various traditional methods for performing knowledge proof can be employed in the embodiment of the invention. Since they are known in the art, the details thereof are not described here. It is obvious to those skilled in the art that both interactive and non-interactive knowledge proof can be employed in the embodiment of the invention. The non-interactive version of knowledge proof may reduce round trip communication between the user device and the service device, and hence is advantageous in terms of network utilization and time consumption. However, it may require that the user device and the service device share the same time origin so as to defend against replay attack. The advantage and drawback of interactive and non-interactive variants are well known to those skilled in the art.

Now turn back to FIG. 8. At step S803, $RH_i$ publishes its public key $PK_i^{RH} = \{(B_i^j, \Sigma_i^j)\}, j=1, 2, \ldots, n_i$, via the communication unit 430, where $B_i^j$ is the public key of the resource $R_i^j$. Alternatively, $RH_i$ may transmit $\{(B_i^j, \Sigma_i^j)\}, j=1, 2, \ldots, n_i$ to PA and have it published by PA instead of publishing $PK_i^{RH}$ by $RH_i$ itself. As known, $\Sigma_i^j$ indicates that the resource holder $RH_i$ generates $R_i^j$ in a manner against attack to the system.

In fact, it is also possible that the pseudonym authority assigns, instead of the resource holder, resource private keys for the resources managed by the resource holder. In addition, the signature of knowledge proof of the resource private key as well as the resource public key may be computed and published by the pseudonym authority. In an alternative embodiment of the invention, the pseudonym authority may further comprise a resource key generating unit (not shown) for assigning the resource private keys, computing the resource public keys and/or generating the signature of knowledge proof of the resource private keys.

Pseudonym Issuance

Figure 9:
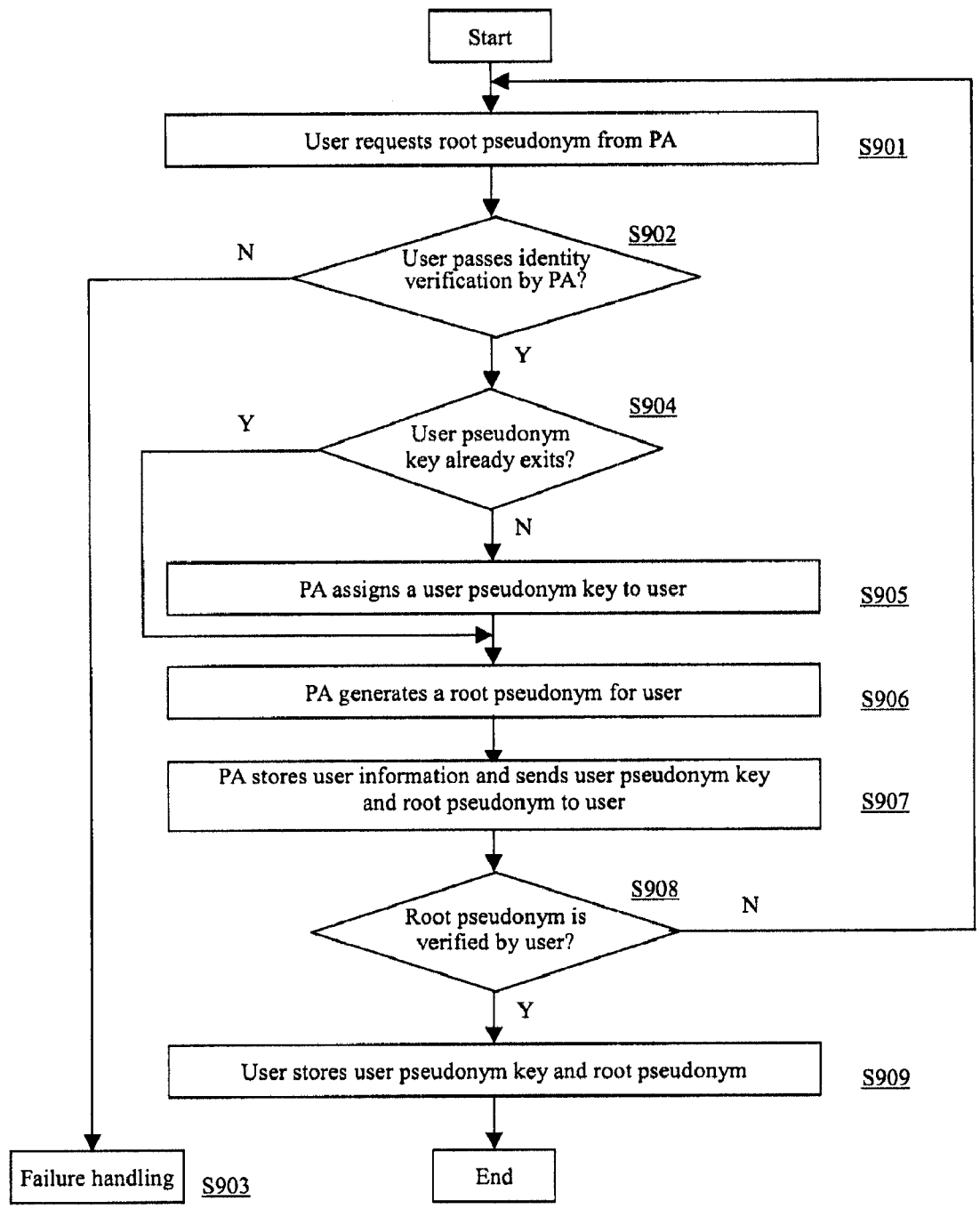
FIG. 9 is a flow chart illustrating the procedures for issuing root pseudonyms according to the first embodiment of the invention.

FIG. 9 illustrates the particular procedures for issuing root pseudonyms according to the first embodiment of the invention. As shown in FIG. 9, given the PA public key $PK^{PA}$, a user that has verifiable identity U carries out the following interactions with PA in order to get pseudonym from PA.

At step S901, the root pseudonym acquiring unit 510 of the user terminal requests a root pseudonym from PA, and the user's verifiable identity U is transmitted to PA by the communication unit 560.

At step S902, the identity verification unit 320 of PA verifies the user's identify U so as to determine whether to issue a root pseudonym to that user. If the user fails to pass the verification, PA will not issue a root pseudonym to the user, and the process proceeds to step S903 for failure handling. For example, the user is notified of the cause of failure and the process is ended, or the user is required to retransmit the information.

If it is determined that the user is qualified be issued with a pseudonym, the user pseudonym key assigning unit 330 of PA checks its database (which may for example be stored in the storage unit 350) for a user pseudonym key z storing for U at step S904. If a matching user pseudonym key is found, the process proceeds to step S906. Otherwise, the process proceeds to step S905 where the user pseudonym key assigning unit 330 of PA selects $z \in_R \mathbb{Z}_p^*$ for U as the pseudonym key of that user.

At step S906, the root pseudonym generating unit 340 of PA computes $t = g_1^{1/(a+z)} \in \mathbb{G}_1$ as the root pseudonym of the user.

At step S907, PA stores (U, z) in the database in the storage unit 350, and sends the user pseudonym key z as well as the root pseudonym t to the user by the communication unit 360.

After receiving the user pseudonym key z and the root pseudonym t sent by PA, the root pseudonym acquiring unit 510 of the user terminal checks whether $e(t, A \cdot g_2^z) = e(g_1, g_2)$. If the verification is failed, the process proceeds to step S901 to make the request again. Alternatively, the user sends a notification to PA to require retransmission of data.

If the verification is success, the user stores the user pseudonym key z and the root pseudonym t in the storage unit 550.

It should be noted that there are various methods as known for PA to verify the identity of the user and ensure the association between the verifiable identity U of the user and the real user. Since how PA achieves this is not directly related to the invention, the detailed description thereof is omitted here.

Credential Issuance

Figure 10:
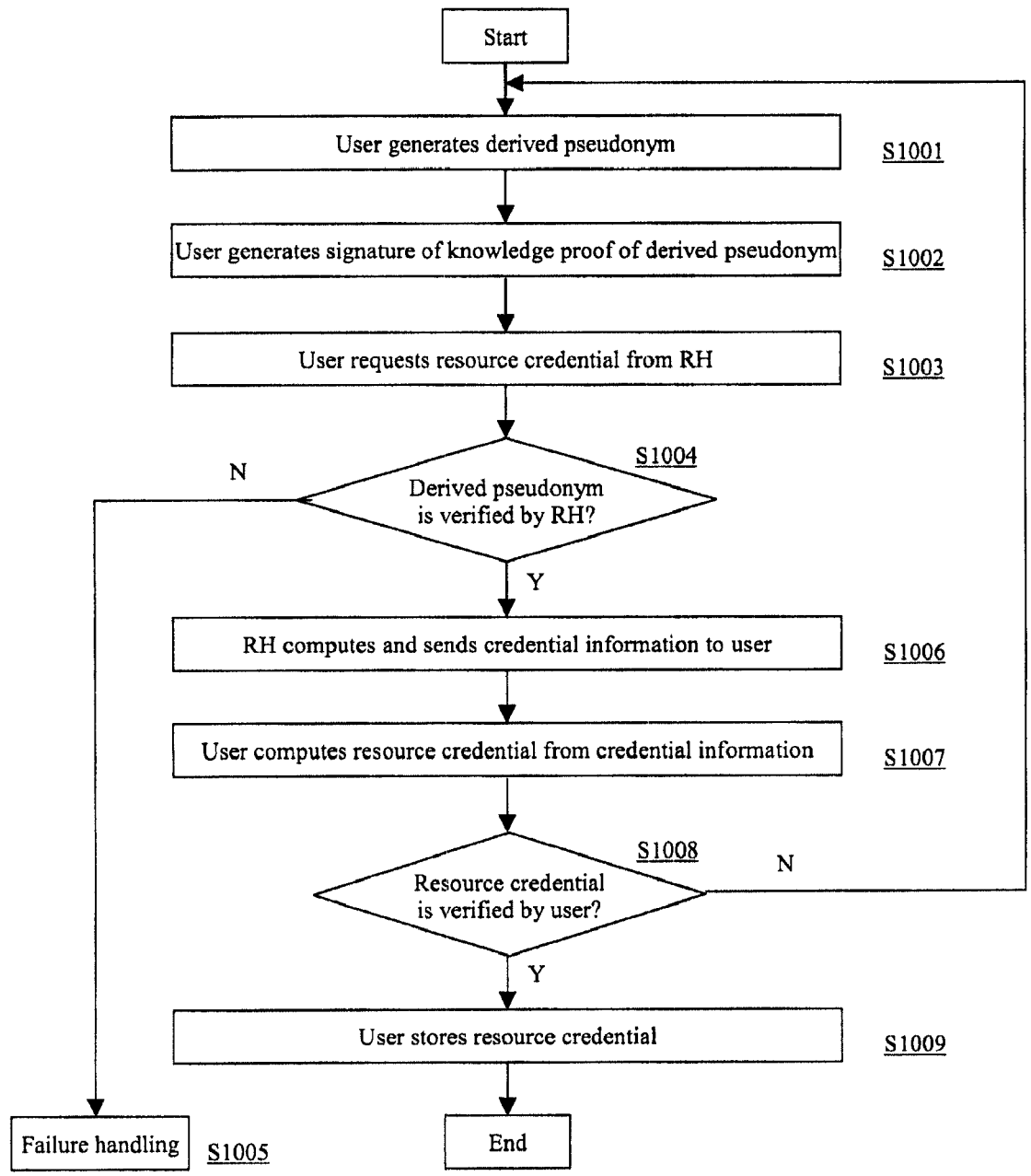
FIG. 10 is a flow chart illustrating the procedures for issuing credentials according to the first embodiment of the invention.

The procedures of credential issuance may be interpreted conceptually into two phases. The first phase is to perform pseudonym verification, while the second phase is to issue the credentials. FIG. 10 illustrates the particular procedures for credential issuance according to the first embodiment of the invention. As shown in FIG. 10, given the PA public key $PK^{PA}$ and the public key $B_i^j$ of the resource $R_i^j$, the user that possesses the user pseudonym key z and the root pseudonym t carries out the following interactions with the resource holder $RH_i$ who manages the resource $R_i^j$ in order to get access right on the resource $R_i^j$.

At step S1001, the derived pseudonym generating unit 520 of the user terminal selects $\tau \in_R \mathbb{Z}_p^*$, and computes a derived pseudonym $T = t^\tau$.

At step S1002, the derived pseudonym generating unit 520 of the user terminal computes a signature of knowledge proof $$\Sigma = SKP\{(x_1, x_2): e(T, A) = e(g_1, g_2)^{x_1} \cdot (e(t^{-1}, g_2)^\tau)^{x_2}\}$$

At step S1003, the resource credential acquiring unit 530 of the user terminal requests a credential for the resource $R_i^j$ from the resource holder $RH_i$, and the derived pseudonym T as well as the signature of knowledge proof are transmitted to the resource holder $RH_i$ via the communication unit 560.

At step S1004, after receiving $\Sigma$, $RH_i$ checks validity of $\Sigma$. If $\Sigma$ is invalid, $RH_i$ does not issue the credential to the user and the process proceed to step S1005 for failure handling. For example, the user is notified of the cause of failure and the process is ended, or the user is required to retransmit the information.

If $\Sigma$ is valid, the credential information generating unit 430 of $RH_i$ computes credential information $v_{ij}^1 = T^{b_i^j}$, and the credential information $v_{ij}'$ is transmitted to the user at step S1006.

After receiving the credential information $v_{ij}'$ from $RH_i$, the resource credential acquiring unit 530 of the user terminal computes a resource credential $v_{ij} = v_{ij}'^{1/\tau}$.

Then at step S1008, the resource credential acquiring unit 530 of the user terminal checks whether $e(t, B^j) = e(v_{ij}, g_2)$. If the verification is failed, the process turns back to step S1001 to make a request again. Otherwise, the user sends a notification to $RH_i$ to require retransmission of data.

If the verification is success, the user stores $v_{ij}$ in the storage unit 550 as the resource credential for the resource $R_i^j$ at step S1009.

Although the credential issuance procedures arch described above by taking as an example that the user requests the credential for the resource $R_i^j$, it is conceivable that in the case that the resource holder manages a plurality of resources, the user may obtain a plurality of resource credentials by performing the above procedures multiple times, or simultaneously requests for and obtain the plurality of resource credentials by performing the procedures once.

Of course, it is also possible that the user obtains the resource credentials from the resource holder by using the root pseudonym t directly. In this case, the forgoing derived pseudonym T is replaced with the root pseudonym t, and $RH_i$ transmits $t^{b_i^j}$ to the user, and the user stores $t^{b_i^j}$ directly as the resource credential.

Authorization

Logically, authorization is preceded by authentication. So, the authorization procedures are divided into two phases. The first phase is to verify the user's pseudonym and the second phase is to verify the user's credentials associated with his/her pseudonym.

Figure 11:
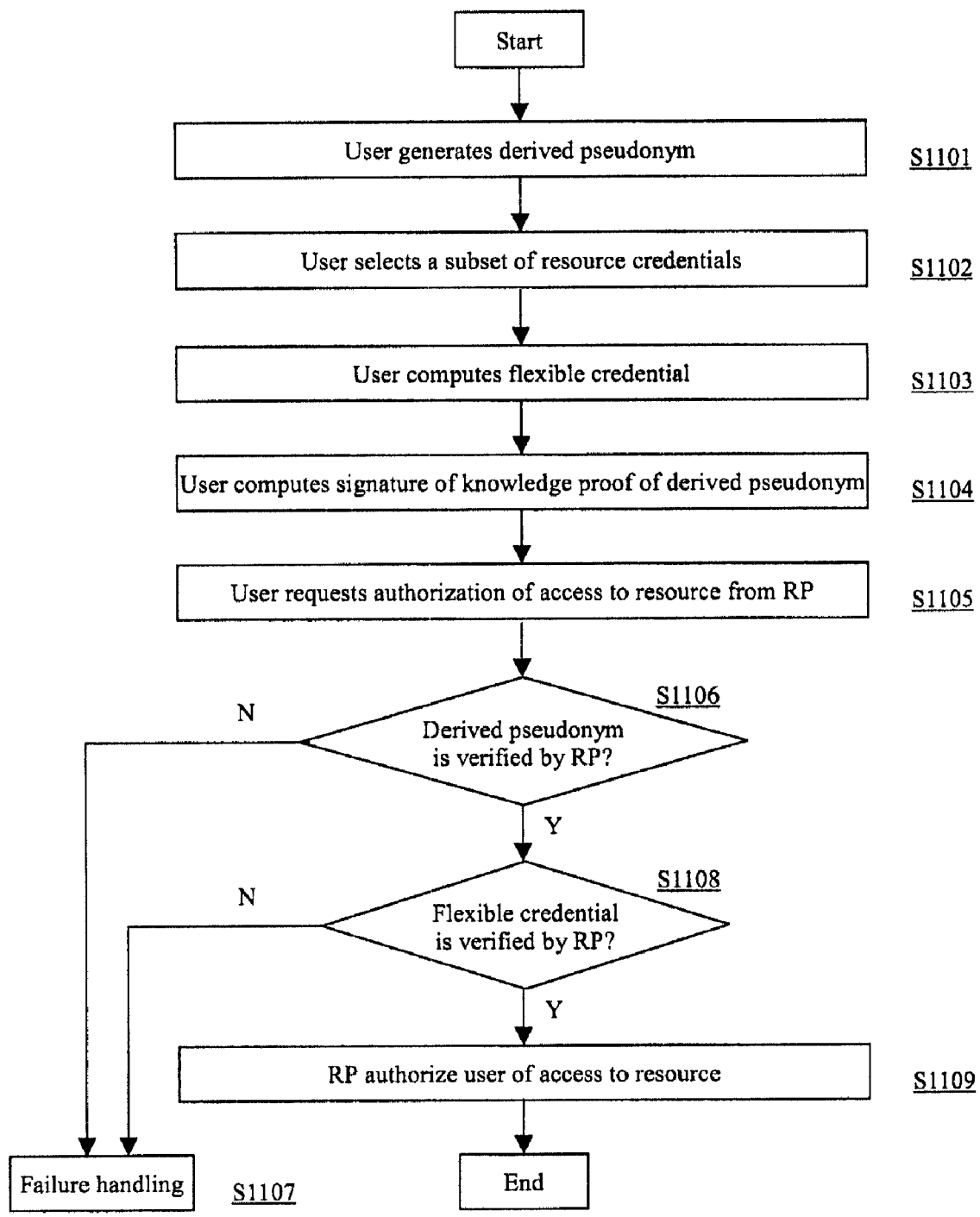
FIG. 11 is a flow chart illustrating the procedures for authorization according to the first embodiment of the invention.

FIG. 11 illustrates the particular authorization procedures according to the first embodiment of the invention.

Given PA public key $PK^{PA}$, public-keys $\{PK_i^{RH}\}$ of the resource holders, and given that a user has a user pseudonym key z, a root pseudonym t and a set of credentials $\Lambda=\{v_{ij}\}$, the user can access resources $R=\{R_i^j\}$ having a set of public keys $B=\{B_i^j\}$. The procedures described below with reference to FIG. 11 illustrate how the user convinces a resource protector RP that he/she has access rights on a subset of resources $\hat{R} \in R$ chosen by the user.

Based on the set of public keys $\hat{B} \in B$ corresponding to $\hat{R}$, what the user needs to do is to demonstrate that he/she holds a subset of credentials $\hat{A} \in A$ representing access rights on resources $\hat{R}$. Without loss of generality, $\hat{R}$ is wrote as $\hat{R}=\{R_\phi\}$, and $\hat{B}$ is wrote as $\hat{B}=\{B_\phi\}$, $\phi=1, 2, \ldots, \hat{n}$. The subset of credentials, as the secret of the user, is $\hat{A}=\{v_\phi\}$, $\phi=1, 2, \ldots, \hat{n}$.

At step S1101, the derived pseudonym generating unit 520 of the user terminal selects $\tau \in_R \mathbb{Z}_p^*$ and computes a derived pseudonym $T=t^\tau$. It should be noted that it is preferred to use a different derived pseudonym in the authorization procedures than the derived pseudonym used in the foregoing credential issuance procedures. This can be done by selecting a different $\tau$. To simplify the description, the same denotation T is used for various derived pseudonyms. However, it would be appreciated that the derived pseudonyms used in credential issuance procedures and the authorization procedures each time may be different.

At step S1102, the flexible credential generating unit 540 of the user terminal selects a subset of resource credentials $\hat{A}=\{v_\phi\}$, $\phi=1, 2, \ldots, \hat{n}$, corresponding to the resources to be accessed. On or more resources to be accessed may be determined, for example, by the flexible credential generating unit 540 in accordance with the user's command (for example, the user input from the additional input means). Alternatively, the user terminal may further comprise an additional resource selection unit (not shown) coupled to the flexible credential generating unit 540 for selecting the resources desired to access.

At step S1103, the flexible credential generating unit 540 of the user terminal computes a flexible credential $$V = \left(\prod_\varphi v_\varphi\right)^\tau$$

according to selected subset of credentials.

At step S1104, the derived pseudonym generating unit 520 of the user terminal computes a signature of knowledge proof:

$$\Sigma = SKP\{(x_1,x_2): e(T,A) = e(g_1, g_2)^{x_1} \cdot (e(t^{-1}, g_2)^\tau)^{x_2}\}$$

Then, at step S1105, the user request for authorization of access to the resources $\hat{R}$, and transmits the flexible credential V, the derived pseudonym T and the signature of knowledge proof $\Sigma$ to the resource protector RP.

Upon receiving $\Sigma$ and the flexible credential V, the pseudonym verification unit 610 of RP checks the validity of $\Sigma$ at step S1106. If $\Sigma$ is invalid, RP denies the user and the process proceeds to step S1107 for failure handling. For example, the user is notified of the cause of failure and the process is ended, or the user is required to retransmit the information.

If $\Sigma$ is valid, the flexible credential verification unit 620 of RP checks whether $$e\left(T, \prod_\varphi B_\varphi\right) = e(V, g_2)$$

at step S1108. If the equation does not hold, the process proceeds to step S1107 for failure handling. For example, the user is notified of the cause of failure and the process is ended, or the user is required to retransmit the information.

If the equation holds, RP is convinced of that the user has access rights on the resources $\hat{R}$ which is a subset of R. Then at step S1109, the authorization unit 630 of RP allows the user to access the resources $\hat{R}$.

Of course, the user may perform interactions with RP by using the root pseudonym and the flexible credential. Those skilled in the art may readily know the corresponding procedures, and the detailed description thereof is omitted here.

It is clear that according to the invention, a user can freely choose any portions of credentials to demonstrate to the resource protector in credential verifying, which is different from the traditional scheme where all of the credentials shall be demonstrated. Tanks to batch verification of $$e\left(T, \prod_\varphi B_\varphi\right) = e(V, g_2),$$

the amount of the expensive cryptographic computations, especially scalar multiplication in additive finite cyclic group, modular exponentiation in multiplicative finite cyclic group and pairing evaluation, is always the same independent of which portion of the credentials are demonstrated.

In the embodiment described above, the tracing capability of PA is not mentioned. However, according to the anonymous flexible credential scheme of the invention, PA may be provided with tracing and revocation capabilities. The additional embodiments with tracing and revocation capabilities of the invention will be described below.

Second Embodiment

The second embodiment with the tracing capability according to the invention is described below.

As described above, the first phase of credential issuance procedures and authorization procedures as well is verifying the user's pseudonym. By a few modifications on pseudonym issuance and pseudonym verification, PA is provided with tracing capability. It should be noted that in the actual practice, tracing and revocation could be assigned to additional tracing authority or revocation authority. It will not affect the substance of invention.

Those skilled in the art may design various solutions. For example, the standard practices described in D. Boneh, X. Boyen, H. Shacham, *Short Group Signatures*, in Proc. of Advances in Cryptology—Crypto'04, LNCS vol. 3152, pp. 41-55, 2004 or K. Zeng, *Pseudonymous PKI for Ubiquitous Computing*, in Proc. of 3rd European PKI Workshop: theory and practice (EuroPKI'06), LNCS vol. 4043, pp. 207-222, 2006 is applicable. The above-mentioned documents are incorporated herein by reference.

In addition, such modification could also empower PA with revocation capability. However, it should be noted that the revocation capability is not fine-grained by the modifications according to the traditional scheme. In other words, PA can only revoke a user's pseudonym and all the credentials of that user at the same time.

By taking the method proposed in K. Zeng, *Pseudonymous PKI for Ubiquitous Computing*, in Proc. of 3rd European PKI Workshop: theory and practice (EuroPKI'06), LNCS vol. 4043, pp. 207-222, 2006 as an example, one embodiment with tracing capability of the invention is described below. The configurations of this embodiment are similar to those in the first embodiment with several modifications. For clarity, only the differences between this embodiment and the above first embodiment are described below, and the same reference signs denote the like parts. It should be noted that the description here is only for reference purpose. As indicated above, those skilled in the art may employ other method to realize tracing capability of PA based on the anonymous flexible credential scheme of the invention.

The example of modification made to the first embodiment of the invention is described below.

During pseudonym issuance, the user needs to compute and send the user's public key (h, $h^{x_u}$) and $y'=g_2^{x_u} \in \mathbb{G}_2$ for tracing purpose to PA, where h is an additional parameter of PA public key $PK^{PA}$ and $x_u$ is the user's private key. This computation may be performed by the root pseudonym acquiring unit 510 of the user terminal or by an additional unit capable of obtaining or generating the user's private key and public key. The methods for obtaining and using user's public and private keys are known in the art, and the detailed description thereof is omitted here. The user may send the user's public key h and $h^{x_u}$ to PA by including it in the user's identity at step S901 shown in FIG. 9 described above.

In addition, in step S906 shown in FIG. 9 described above, the root pseudonym generating unit 340 of PA computes ( $t_g = g_1^{1/(a+z)}$, $t_h = (h_1 \cdot h^{x_u})^{1/(a+z)} \in \mathbb{G}_1^2{}_1^2$ instead of $t = g_1^{1/(a+z)} \in \mathbb{G}_1$, where $t = t_g \cdot t_h$ will be taken as the root pseudonym of the user, $h_1$ is an additional parameter of PA public key $PK^{PA}$ and $x_u$ is the user's private key. And in step S907, PA will send ( $t_g$, $t_h$) (or send $t_g$ and $t = t_g \cdot t_h$) to the user and will store y' correspond to the user's identity.

Then, at step S909, the user stores not only the root pseudonym $t = t_g \cdot t_h$, but also a revocation parameter $\theta = t_g$, where the revocation parameter $\theta$ is for non-fine-grained revocation purpose.

For pseudonym verification of both credential issuance procedures and authorization procedures, the derived pseudonym generating unit 520 of the user terminal selects an integer $r \in_R \mathbb{Z}_p^*$ and computes the derived pseudonym $T = t^r$. In addition, the user also computes a tracing parameter $T_y = T^{x_u}$, and generates a pseudonym revocation verification parameter $\Theta = \theta^r$ used together with the derived pseudonym T according to the pseudonym revocation parameter (the computations are, for example, performed by the derived pseudonym generating unit 520 of the user terminal in step S1001 shown in FIG. 10 and step S1101 shown in FIG. 11 described above, and in step S1003 shown in FIG. 10 and step S1105 shown in FIG. 11 described above, the user also sends $T_y$ and $\Theta$ to RH or RP). It should be noted that during the credential issuance procedures and the authorization procedures, the user may select different r so as to generate different derived pseudonyms.

Further, for example, at step 1002 shown in FIG. 10 and step S1102 shown in FIG. 11 described above, the derived pseudonym generating unit 520 of the user terminal computes the signature of knowledge proof $$\Sigma = SKP\{(x_1, x_2, x_3) : e(T,A) = v_1^{x_1} \cdot (v_2^r)^{x_2} \cdot v_3^{x_3} 1 = (T^{-1})$$
$$x_3 \cdot T_y^{x_1} \cdot e(\Theta, A) = v_4^{x_1} \cdot (v_5^r)^{x_2}\}$$

where $v_1 = e(g_1 \cdot h_1, g_2), v_2 = e((t_g \cdot t_h)^{-1}, g_2), v_3 = e(h, g_2), v_4 = e(g_1, g_2), v_5 = e(\theta^{-1}, g_2)$ Thus, when it is necessary to trace the real identity of a user who used a derived pseudonym, PA checks whether $e(T, y') = e(T_y, g_2)$ for all y' stored in its database and finds the user pseudonym key and the identify of the user. Thus, with such minor modification, PA is provided with capability of tracing any user's real identity and the use pseudonym key. In such case, PA may comprise a tracing unit (not shown) for performing tracing.

It should be noted that at credential issuance stage, the resource protector $RH_i$ will use $T = (t_g \cdot t_h)^r$ to issue credential to the user, and the user's resource credential will be $v_{ij} = (t_g \cdot t_h)^{bj}$. Since altering $t_g$ and $t_h$ afterwards will invalidate all the user's pseudonyms T and therefore invalidate all $v_{ij}$, i.e., invalidate all the credentials of the user, a pseudonym revocation parameter $\theta$ and related signature of knowledge proof is added for non-fine-grained revocation purpose. Accordingly, PA may comprise a pseudonym revocation unit for revoking derived pseudonym of a user by the above described means of pseudonym revocation parameter $\theta$. For example, the revocation unit may invalidate a user's root pseudonym as well as any derived pseudonym generated from that root pseudonym by invalidating the pseudonym revocation parameter $\theta$. Those skilled in the art may readily design revocation mechanisms. For example, the mechanism in D. Boneh, X. Boyen, H. Shacham, *Short Group Signatures*, in Proc. of Advances in Cryptology—Crypto'04, LNCS vol. 3152, pp. 41-55, 2004 is applied to the pseudonym revocation parameter $\theta$. Of course, the pseudonym revocation parameter $\theta$ is not necessary in terms of the only purpose of tracing the real identity of an anonymous user.

After a user's root pseudonym and the derived pseudonyms generated from the root pseudonym are revoked, the user can no longer pass the pseudonym verification procedures. Naturally the entire credentials associated with the user's root pseudonym and the derived pseudonyms are revoked. Therefore, the revocation realized by the above embodiment is not fine-grained.

One example of tracing based on the user's private key $x_u$ is provided above. However, those skilled in the art may appreciate that other parameters and revocation algorithms may be also employed in the invention to achieve tracing capability of PA. For example, a known or additionally designed parameter (user-unique parameter) may be employed as long as such parameter is unique to the user and the credential authority may reconstruct such parameter from the user's derived pseudonym and information used together with the derived pseudonym, while to other parties, such parameter is non-computable.

For example, with another tracing mechanism proposed in D. Boneh, X. Boyen, H. Shacham, *Short Group Signatures*, in Proc. of Advances in Cryptology—Crypto'04, LNCS vol. 3152, pp. 41-55, 2004, a user pseudonym key z may be used in the invention to realize the tracing capability. An example of procedures for realizing tracing based on the user pseudonym key z is briefly described below.

First, PA publishes an additional public key (u, v, h). PA keeps a private key (x, y) such that $h = u^x = v^y$, where u, v and h are all elements of group $\mathbb{G}_1$.

For the pseudonym verification in the credential issuance procedures and the authorization procedures, the user selects integers $\alpha$ and $\beta$ from $\mathbb{Z}_p^*$ and computes tracing parameters $T_1 = u^\alpha$, $T_2 = v^\beta$ and $T_3 = g_1^z h^{\alpha + \beta}$, instead of $T_y$ in the above example. In the corresponding knowledge proof (computation of signature of knowledge proof), the user sends $T_1$, $T_2$ and $T_3$ to the resource holder or the resource protector, and proves the knowledge of $\alpha$, $\beta$, $\alpha+\beta$ 和 z with respect to the base u, v, h and $g_1$, respectively.

In step S1002 shown in FIG. 10 and step S1102 shown in FIG. 11 described above for example, the derived pseudonym generating unit 520 of the user terminal computes a signature of knowledge proof $$\Sigma = SKP\{(x_1, x_2, x_3, x_4, x_5) : e(T, A) = v_1^{x_1} \cdot (v_2^r)^{x_2} \cdot v_3^{x_3} \wedge T_1 = u^{x_4} \wedge T_2 = v^{x_5} \wedge T_3 = g_1^{x_2} h^{x_4+x_5} \wedge e(\Theta, A) = v_4^{x_1} \cdot (v_5^r)^{x_2}\}$$

where $$v_1 = e(g_1 \cdot h_1, g_2), v_2 = e((t_g \cdot t_h)^{-1}, g_2), v_3 = e(h, g_2), v_4 = e(g_1, g_2), v_5 = e(\Theta^{-1}, g_2)$$

Given a valid knowledge proof of the user, PA is able to decrypt $g_1^z$ from $T_1$, $T_2$, and $T_3$ by computing $g_1^z = T_3/(T_1^x T_2^y)$. Since z is distinct for each user, $g_1^z$ uniquely identifies a user, and thus tracing is realized.

As will be appreciated by those skilled in the art, the tracing capability is not necessarily based on the user private key $x_u$ or the user pseudonym key z. Any other appropriate parameters and algorithms known in the art or additionally designed parameters and algorithms may be employed to realize tracing. Therefore, under the spirit and scope of the invention, those skilled in the art may make various alternations, modifications or improvements to the above-described embodiments without departing from the spirit and scope of the invention.

In an alternative embodiment of the invention, there provides a fine-grained method which can revoke any of the user's credentials while reserve the validity of other credentials of the user. An example of such embodiment is described below.

Second Embodiment

An example of the embodiment where fine-grained revocation capability, i.e., revocation on per user and per right basis, of the invention is provided.

It is assumed that a user $\tilde{U}$ has a user pseudonym key $\tilde{z}$ and access right on a resource $R_i^j$. In some cases, the user's resource credential regarding the resource $R_i^j$ should be revoked due to misbehavior of the user or other reasons. According to this embodiment of the invention, PA can revoke the resource credential possessed by user $\tilde{U}$ regarding the resource $R_i^j$ only, instead of revoke all credentials of the user by non-fine-grained revocation. Generally, before the per user and per right revocation, PA needs to performing tracing to disclose the real identity of the user $\tilde{U}$ as well as his/her user pseudonym key $\tilde{z}$. For example, the methods described in the above second embodiment may be used to perform tracing.

The third embodiment where a fine-grained revocation capability is provided is briefly described below.

The scheme of fine-grained revocation according to the third embodiment of the invention may be implemented by simply adding corresponding parts for revocation and updating to PA, RH, user terminal and RP in the above first embodiment. FIGS. 12-15 illustrate the examples of configurations of PA, RH, the user terminal and RP according to the third embodiment of the invention.

Figure 12:
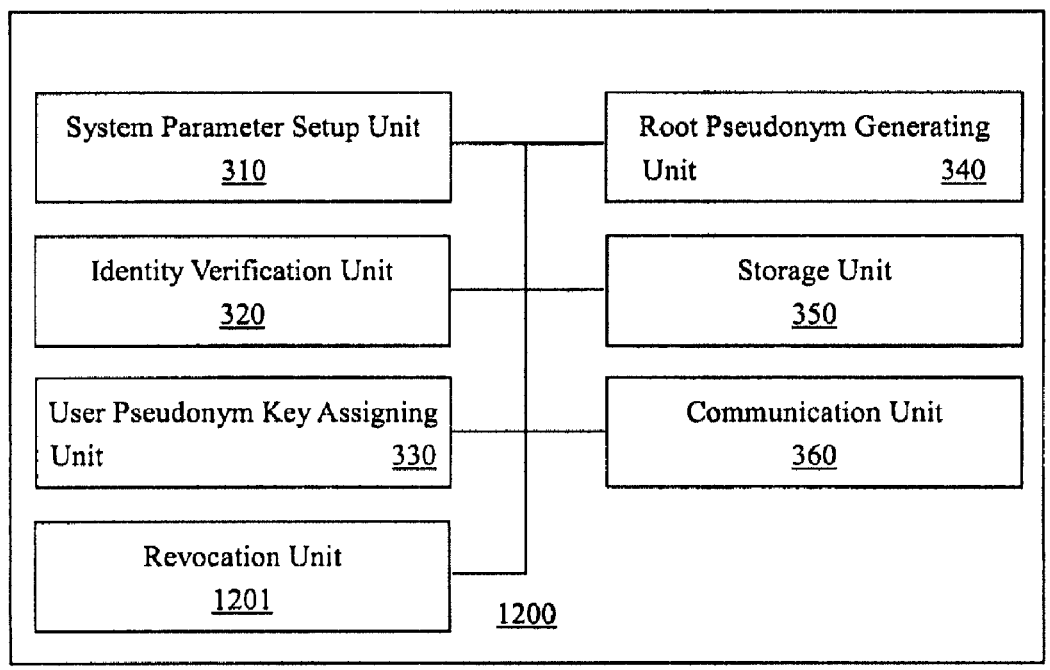
FIG. 12 is a block diagram illustrating an example of configuration of PA according to a third embodiment of the invention.
Figure 13:
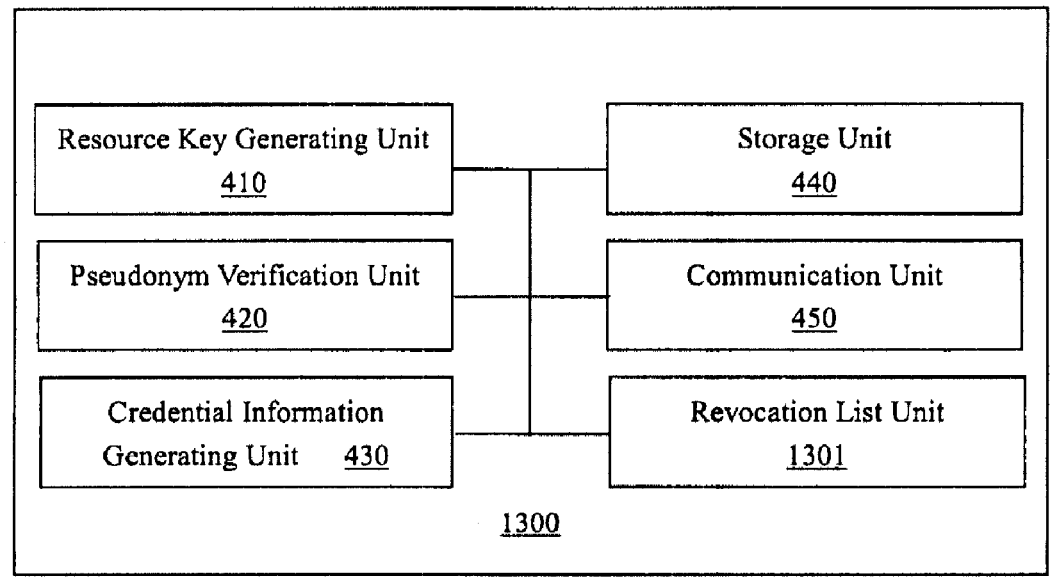
FIG. 13 is a block diagram illustrating an example of configuration of RH according to the third embodiment of the invention.
Figure 14:
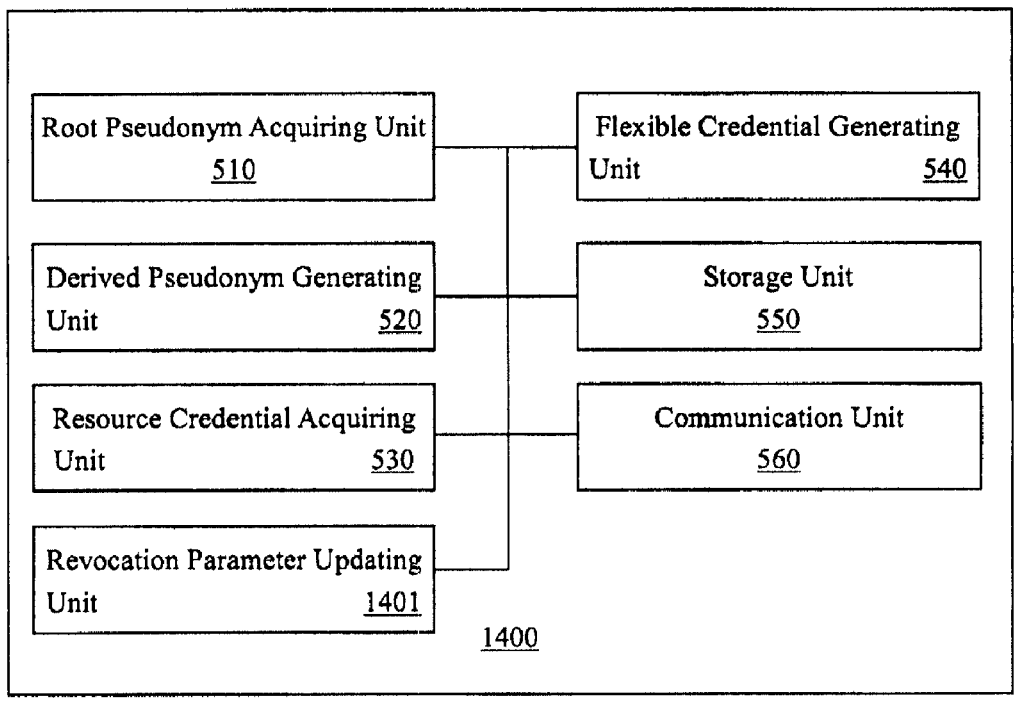
FIG. 14 is a block diagram illustrating an example of configuration of user terminal according to the third embodiment of the invention.
Figure 15:
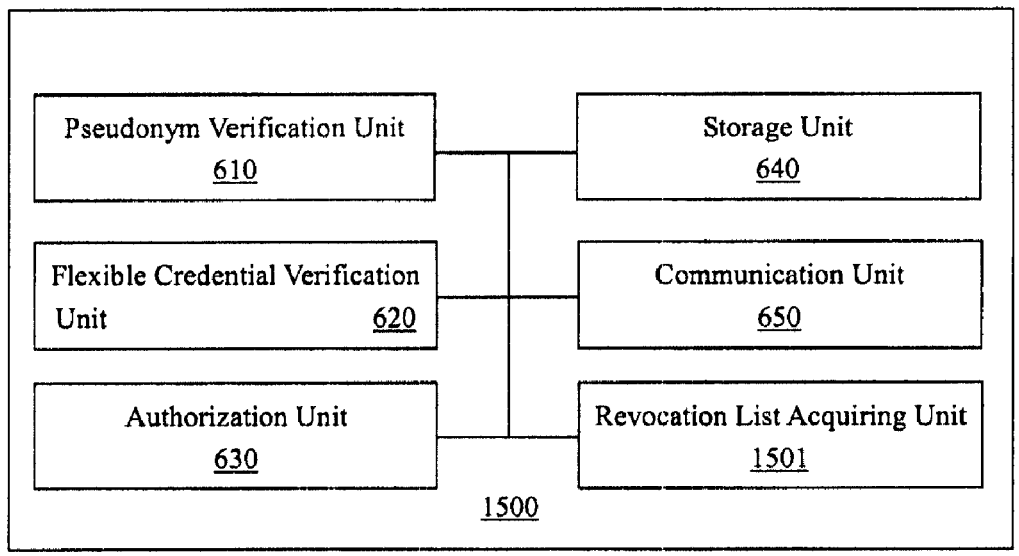
FIG. 15 is a block diagram illustrating an example of configuration of RP according to the third embodiment of the invention.
Figure 16:
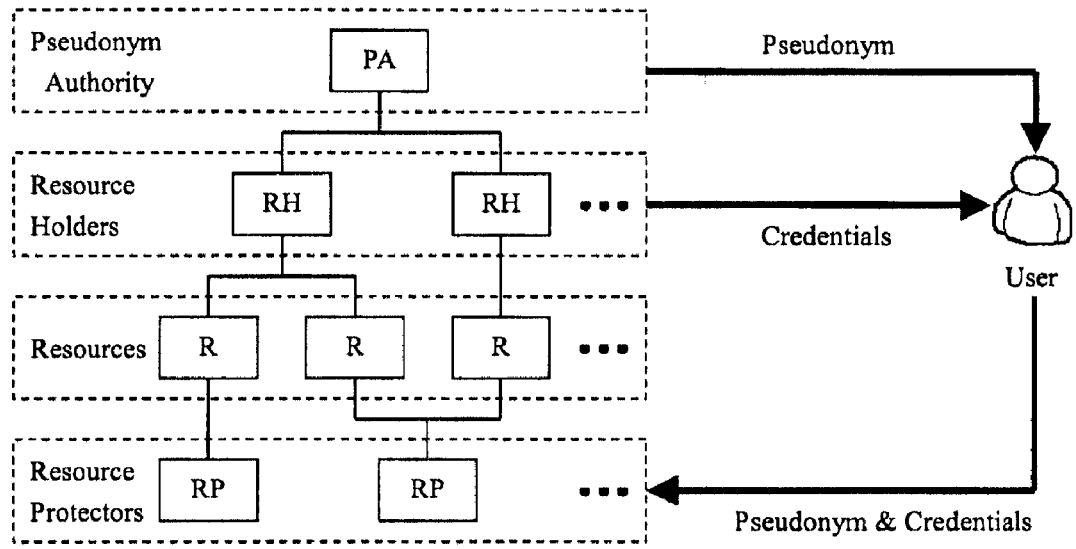
FIG. 16 is a diagram illustrating the traditional authorization system.
Figure 17:
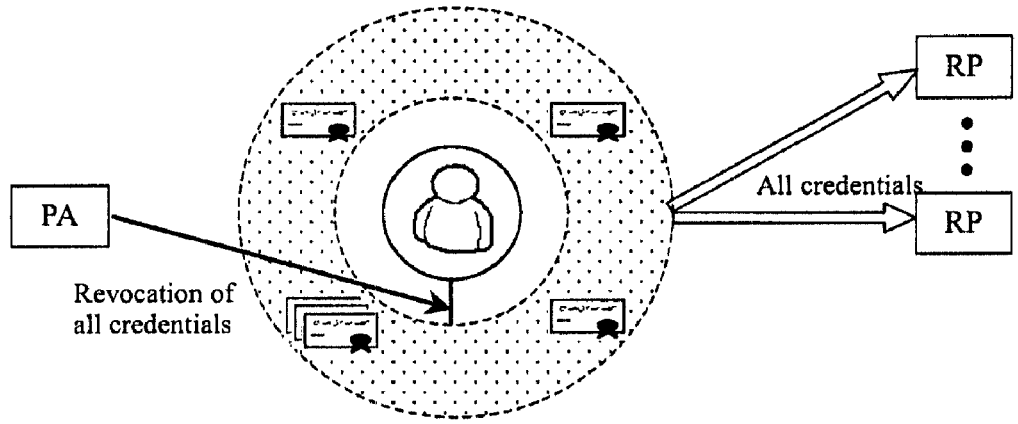
FIG. 17 is a diagram illustrates the traditional schemes of authorization and revocation.

Specifically, as shown in FIG. 12, PA 1200 according to the third embodiment of the invention comprises, in addition to those shown in FIG. 3, a revocation unit 1201 for revoking any one of resource credentials of one of users. As shown in FIG. 13, RH 1300 according to the third embodiment of the invention comprises, in addition to those shown in FIG. 4, a revocation list unit 1301 for initializing or maintaining a revocation list. As shown in FIG. 14, the user terminal 1400 according to the third embodiment of the invention comprises, in addition to those shown in FIG. 5, a revocation parameter updating unit 1401 for updating credential revocation parameter. As shown in FIG. 15, RP 1500 according to the third embodiment of the invention comprises, in addition to those shown in FIG. 6, a revocation list acquiring unit 1501 for acquiring the latest revocation list.

The example of procedures of the third embodiment of the invention is described in detail below.

In the setup procedure of the resource holder, the resource holder $RH_i$ generates a private key $b_i^j \in_R \mathbb{Z}_p^*$ and a public key $B_i^j = g_2^{b_i^j} \in \mathbb{G}_2$, $j=1, 2, \ldots, n_i$, for each resource $R_i^j$, and after that, the revocation list unit 1301 thereof initializes a revocation list $RL_i^j = \{(g_{1i}^j, \Delta)\}$ for each $R_i^j$, where $g_{1i}^j = g_1^{b_i^j} \in \mathbb{G}_1$ and $\Delta$ indicates that there is no revocation now, that is, the tuple ($g_{1i}^j, \Delta$) is the first row of $RL_i^j$ ($j=1, 2, \ldots, n_i$).

Then, at step S802 in FIG. 8 described above, the resource key generating unit 410 will generate signature of knowledge proof for each set of $B_i^j$ and $g_{1i}^j$ as follow:

$$\Sigma_i^j = SKP\{(x_j) : B_i^j = g_2^{x_j} \wedge g_{1i}^j = g_1^{x_j}\}, j=1, 2, \ldots, n_i$$

And, at step S803 in FIG. 8 described above, $RH_i$ publishes its public key $PK_i^{RH} = \{(B_i^j, RL_i^j, \Sigma_i^j)\}$, $j=1, 2, \ldots, n_i$. Also, instead of publishing $PK_i^{RH}$ by itself, $RH_i$ may send $(B_i^j, RL_i^j, \Sigma_i^j)$ to PA and let PA publish it alternatively.

Actually, it is also possible that PA generates the initial revocation list for each $R_i^j$. For example, in an alternative embodiment of the invention, the initial revocation list of a resource may be generated by, for example, the revocation unit 1201 of PA in the case that the PA obtains resource private and public keys from the resource holder or PA generates the resource private and public keys.

During the credential issuance procedures, the user also stores $\omega_{ij} = v_{ij}$ in addition to $v_{ij}$ in step S1009 in FIG. 10 described above, where $\omega_{ij}$ is an credential revocation parameter added for the purpose of per user and per right revocation, which may be generated by the revocation parameter updating unit 1401 of the user terminal as the initial value.

The procedures for revoking the user $\tilde{U}$'s resource credential regarding the resource $R_i^j$ by PA are described below.

First, the revocation unit 1201 of PA retrieves $g_{1i}^j$ from the last (latest) row of the revocation list $RL_i^j$ associated with the resource $R_i^j$.

Then, the revocation unit 1201 computes $\tilde{g}_{1i}^j = g_{1i}^{j 1/(a+\tilde{z})}$.

Then, the revocation unit 1201 adds a new row ($\tilde{g}_{1i}^j$, $\tilde{z}$) to the revocation list $RL_i^j$ and publishes the updated revocation list by the communication unit 340.

Consider another user U who has a user pseudonym key z and a credential ($v_{ij}$, $\omega_{ij}$), that is, user U is authorized to access the resource $R_i^j$. Since the access right of user U with respect to the resource $R_i^j$ is not revoked, user U can update his/her credential revocation parameter $\omega_{ij}$ for the resource $R_i^j$ to $\tilde{\omega}_{ij} = (\tilde{g}_{1i}^j / \omega_{ij})^{1/(z-\tilde{z})}$ at each time an updated revocation list for the resource $R_i^j$ is published, i.e., a new row is added. It's easy to verify that $\tilde{\omega}_{ij}^{1+z} = g_{1i}^{j 1/(a+\tilde{z})} = \tilde{g}_{1i}^j$ It should be noted that every time the revocation list is added a new row, user U can update the related credential revocation parameter correspondingly. Alternatively, user U may carry out the updating periodically or only when it is necessary in accordance with the revocation history (previous rows) in the revocation list of the resource and the lasted row.

It should be noted that, it's also possible that the authorization system lets PA send ($\tilde{g}_{1i}^j$, $\tilde{z}$) to the resource holder of $R_i^j$ and ask the resource holder to update $RL_i^j$. In such situation, the revocation list unit of the resource holder performs the updating of the revocation list. However, according to fine-grained revocation of the invention, the revocation never utilizes any secret key of resource holders. Therefore, without consent or involvement of the resource holder, PA alone is able to carry out fine-grained revocation.

The authorization procedures according to the third embodiment of the invention are described below.

Suppose during authorization procedures, the resource protector RP is in particular curious about whether the users' access right on a resource $R_k \in \hat{R}$ is revoked or not. Then, both the revocation parameter updating unit 1401 of user U and the revocation list acquiring unit 1501 of the resource protection RP will retrieve $g_1^k$ from the last row of revocation list RL associated with $R_i^j$. And in step S1103 in the authorization procedures described above with reference to FIG. 11, the flexible credential generating unit 540 of user U computes a credential revocation verification parameter $W=\omega_k^\tau$ according to the credential revocation parameter of the resource $R_k$, in addition to the flexible $$V = \left(\prod_\varphi v_\varphi\right)^\tau$$

credential according to the selected subset of the credentials.

Then at step S1104 described above with reference to FIG. 11, user U computes a signature of knowledge proof as follow:

$$\Sigma = SKP\{(x_1, x_2): e(g_1, g_2)^{x_1} \cdot (e(t^{-1}, g_2)^\tau)^{x_2} \cdot e(W, A)$$
$$= e(g_1^k, g_2)^{x_1} \cdot (e(\omega_k^{-1}, g_2)^\tau)^{x_2}\}$$

Now, a valid $\Sigma$ not only proves that user U has access rights on the resources $\hat{R}$ but also convinces RP that his/her resource credential regarding the resource $R_k \in \hat{R}$ is not revoked. On the other hand, since the user whose resource credential of the resource $R_k$ is revoked cannot effectively update his/her credential revocation parameter, he/she cannot generate a valid signature of knowledge proof and thus cannot pass the authorization procedures.

If RP is curious about whether there are more resource credentials (for example, not only $R_k \in \hat{R}$ but also $R_m \in \hat{R}$) are revoked, the revocation parameter updating unit 1401 of user U will further update the credential revocation parameter $\omega_m$ of the resource $R_m$, and the revocation list acquiring unit 1501 of the resource protector RP will further retrieve $g_1^m$ from the last row of the revocation list RL associated with the resource $R_m$. Moreover, in step S1103 in the authorization procedures described above with reference to FIG. 11, the flexible credential generating unit 540 of user U computes a credential revocation verification parameter $W=(\omega_k \omega_m)^\tau$. Then, at step S1104 described above with reference to FIG. 11, user U will compute a signature of knowledge proof as follow:

$$\Sigma = SKP\{(x_1, x_2) \cdot e(T, A) = e(g_1, g_2)^{x_1} \cdot (e(t^{-1}, g_2)^\tau)^{x_2} e$$
$$(W, A) = e(g_1^k g_1^m, g_2)^{x_1} \cdot (e((\omega_k \omega_m)^{-1}, g_2)^\tau)^{x_2}\}$$

Of course, by a single knowledge proof, more credentials may be similarly verified of being revoked or not. It can be readily seen that the required amount of expensive computations is independent of the number of resource credentials which is to be particularly verified of being revoked or not (that is, the same as that for verifying whether a single resource credential is revoked) according to the fine-grained revocation capability of the invention.

The fine-grained revocation capability according to the invention is described above. Of course, instead of performing tracing and revocation by PA, it is also possible to set additional tracing authority and revocation authority in the system to perform tracing and revocation with the above-described method of the invention.

In addition, PA or additional revocation authority can also having both fine-grained revocation capability and non-fine-grained revocation capability (for example, the revocation by using the pseudonym revocation parameter θ in the above second embodiment) according to the invention, and thus can selectively perform fine-grained and non-fine-grained revocation. Since those skilled in the art may readily incorporate the parameters for non-fine-grained revocation and related knowledge proof to the above scheme with fine-grained revocation capability in view of the above description, the particular description of the algorithm thereof is omitted here. According to an alternative embodiment of the invention, fine-grained and non-fine-grained revocations can be performed by the revocation unit 1201 of PA.

It can be seen from the above description that invention has the following effects:

After a user is authorized, the user could remain anonymous no matter how many times the user demonstrates his/her credentials to RP, while further contacting RH and/or PA is not needed. At the same time, the number of RHs PA can accommodate is variable after the public key of PA is determined and published. Also, the number of resources a RH can manage is not fixed after the public key of RH is determined and published while change of the credentials having being issued is not needed.

The user can selectively demonstrate to RP any one or more of all his/her access rights, while at the same time the computational cost for the user to prove any portion of the access rights is independent of the number of rights to be proved (the same as that for proving only one right).

PA can revoke any one of the resource credentials of a user without altering other rights of the user. And, PA can revoke the access right of a user without involvement of RH, or in other words, fine-grained revocation is achieved without entailing secret key of RH. In addition, the amount of expensive computations required for verifying whether arbitrary number of resource credentials are revoked is constant, that is, the same as that for verifying whether a single resource credential is revoked.

The particular embodiments according to the invention are described above with reference to the drawings. However, the invention is not limited to the particular configurations and processes shown in the drawings.

For example, various measures may be adopted in the above various interactions to ensure safety. For example, for the step applying the signature of knowledge proof in the above credential issuance procedures, time-variant parameters could be used to counteract replay and interleaving attacks, to provide uniqueness and timeliness guarantees, and to prevent certain chosen-text attacks (see A. Menezes, P. van Oorschot, S. Vanstone, *Handbook of Applied Cryptography*, CRC Press, 1996, which is incorporated herein by reference). Such time-variant parameters are for example time-stamp or random number challenge. For the sake of simplicity, the detailed description of these know methods is omitted here.

In the above embodiments, traditional multiplicative group notations are used as an example. However, those skilled in the art may appreciate that the additive notations used in elliptic curve settings may be similarly employed. For example, when additive notations are used, the above described flexible credential will be computed as $$V = \tau\left(\sum_{\varphi=1} v_\varphi\right).$$

Several particular steps are described and shown in the above embodiments as examples. However, the processes of the method of the invention are not limited to the particular steps shown and described, and those skilled in the art may make various changes, modifications and additions after learning the spirit of the invention. For example, in step S1101-S11-3 in the above first embodiment, the user generates the flexible credential V after generating the derived pseudonym T. However, the user can select τ and generate the flexible credential V firstly, and then generate the derived pseudonym T.

PA, RH, user terminal and RP according to the invention may be implemented as various device in a network or coupled to the network, such as, for example, personal computer, server, mobile device such as mobile phone, personal digital assistant, laptop computer and so on, or the hardware of software modules in the above various devices.

Although as examples of configurations of PA, RH, user terminal and RP, some units and modules are shown as coupled to each other in the drawings, the parts included in each device are not limited to the described units and modules, and the particular configuration thereof may be modified or changed. For example, some units shown separately may be combined together, or one unit may be divided into several units in accordance with its functions. For example, the storage unit as shown may be implemented as several components, each of which is incorporated in a unit for storing data for that unit.

In addition, although illustrative units and modules are shown as having particular functions respectively, the functional division of units and modules is not limited to the shown example, but can be arbitrarily amended, exchanged and combined. For example, the above described pseudonym revocation verification parameter and credential revocation verification parameter are generated by the derived pseudonym generating unit and the flexible credential generating unit of the user terminal respectively, but alternatively the computations of various revocation parameters may be performed by the revocation parameter updating unit or an additional unit. Further, instead of generating signature of knowledge proof by the related units described above, each device may additionally include a separate knowledge proof unit for performing the related knowledge proof.

In addition, each of PA, RH, user terminal and RP can simultaneously have the functions of other parties. For example, RH and RP may be implemented in the same server simultaneously.

In addition, when implemented as particular devices, PA, RH, user terminal and RP may further comprise other units necessary for the particular devices, such as, for example, a display unit for displaying information to an operator, an input unit for receiving input from the operator, a controller for controlling the operation of each unit, and so on. Since these components are known in the art, the detailed description thereof is omitted, and those skilled in the art may readily conceive of adding them to the above described devices.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine readable medium or transmitted by a data signal embodied in a carrier wave over a transmission medium or communication link. The "machine readable medium" may include any medium that can store or transfer information. Examples of a machine readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as the Internet, Intranet, etc.

The invention may be embodied in other specific forms without departing from the spirit or essential characteristics thereof For example, the algorithms described in the specific embodiments can be modified as long as the characteristics do not depart from the basic spirit of the invention. The present embodiments are therefore to be considered in all respects as illustrative and not restrictive, and the scope of the invention is indicated by the appended claims rather than by the foregoing description, and all changes which come within the meaning and range of equivalency of the claims are therefore intended to be embraced therein.

What is claimed is:

1. A method for a communication system, comprising:
performing using a hardware processor:
issuing a root pseudonym;
acquiring one or more resource credentials;
generating a first derived pseudonym from the root pseudonym;
selecting a set of resource credentials from said one or more resource credentials;
generating a flexible credential from the set of resource credentials;
making a request for an access by using the first derived pseudonym and the flexible credential; and
granting the request for an access after verifying the first derived pseudonym and the flexible credential,
wherein acquiring one or more resource credentials comprises:
requesting a resource credential by using the root pseudonym;
calculating $v_{ij}=t^{b_i^j}$, where t is the root pseudonym and $b_i^j$ is the resource private key of the resource; and
storing $v_{ij}$ as the resource credential for the resource.

2. The method according to claim 1, further comprising:
generating a resource private key and a resource public key for each resource.

3. The method according to claim 1, wherein issuing a root pseudonym further comprises:
assigning and storing a user pseudonym key; and
generating the root pseudonym based on the user pseudonym key.

4. The method according to claim 1, further comprising:
generating a tracing parameter from a user-unique parameter, wherein the tracing parameter may be used in connection with the root pseudonym or a derived pseudonym generated from the root pseudonym for tracing.

5. The method according to claim 1, further comprising:

issuing a pseudonym revocation parameter which may be used to revoke the root pseudonym and any derived pseudonym generated from the root pseudonym; and
generating from the pseudonym revocation parameter a pseudonym revocation verification parameter which is used in connection with a derived pseudonym.

6. The method according to claim 1, further comprising:
generating an initial revocation list for each resource;
when a resource credential is to be revoked, updating the revocation list for the resource corresponding to the resource credential; and
updating a credential revocation parameter for the resource according to the updated revocation list, and generating a credential revocation verification parameter,
wherein verifying the first derived pseudonym further comprises verifying a credential revocation verification parameter based on the parameters in the revocation list for the resource.

7. A method for a communication system, comprising:
performing using a hardware processor:
issuing a root pseudonym;
acquiring one or more resource credentials;
generating a first derived pseudonym from the root pseudonym;
selecting a set of resource credentials from said one or more resource credentials;
generating a flexible credential from the set of resource credentials;
making a request for an access by using the first derived pseudonym and the flexible credential; and
granting the request for an access after verifying the first derived pseudonym and the flexible credential,
wherein acquiring one or more resource credentials comprises:
generating a second derived pseudonym from the root pseudonym, and
acquiring a resource credential by using the second derived pseudonym,
wherein the second derived pseudonym is calculated as $T=t^\tau$, where t is the root pseudonym and $\tau$ is an integer, and wherein acquiring a resource credential by using the second derived pseudonym further comprises:
calculating a credential information $v_{ij}'=T^{b_i^j}$, where $b_i^j$ is the resource private key of the resource; and
storing $v_{ij}=v_{ij}'^{1/\tau}$ as the resource credential for the resource.

8. A method for a communication system, comprising:
performing using a hardware processor:
issuing a root pseudonym;
acquiring one or more resource credentials;
generating a first derived pseudonym from the root pseudonym;
selecting a set of resource credentials from said one or more resource credentials;
generating a flexible credential from the set of resource credentials;
making a request for an access by using the first derived pseudonym and the flexible credential; and
granting the request for an access after verifying the first derived pseudonym and the flexible credential,
wherein the first derived pseudonym is calculated as $T'=t^{\tau'}$, where t is the root pseudonym and $\tau'$ is an integer, and the flexible credential is calculated as $$V = \left(\overset{\overset{i}{\phantom{.}}}{\underset{j=1}{O}} u_j\right)^{\tau'} \text{ or } V = t'\left(\overset{\overset{i}{\phantom{.}}}{\underset{j=1}{\overset{}{a}}} u_j\right),$$

where $u_j$ is the set of resource credentials, j=1, ..., n'.

9. An apparatus for managing credentials for one or more resources in a communication system, comprising:
a hardware processor configured to:
generate a resource private key and a resource public key for each resource;
verify a derived pseudonym of a user; and
generate, based on the derived pseudonym of the user, credential information for a resource which is to be sent to a user terminal of the user,
wherein $v_{ij}'=T^{b_i^j}$ is calculated as the credential information for the resource, where T is the derived pseudonym of the user and $b_i^j$ is the resource private key of the resource.

10. The apparatus according to claim 9, wherein the hardware processor is further configured to generate or receive initial revocation lists for the resources.

11. The apparatus according to claim 9, wherein the hardware processor is further configured to verify a pseudonym revocation verification parameter of the user.

12. A method for managing credentials for one or more resources in a communication system, comprising:
performing using a hardware processor:
generating a resource private key and a resource public key for each resource;
verifying a derived pseudonym of a user when a user's request from a user terminal is received; and
generating, based on the derived pseudonym, credential information for a resource which is to be sent to the user terminal if the verification is passed, wherein the credential information is calculated as $v_{ij}'=T^{b_i^j}$, where T is the derived pseudonym of the user and $b_i^j$ is the resource private key of the resource.

13. The method according to claim 12, further comprising:
generating or receiving initial revocation lists for the resources.

14. The method according to claim 12, further comprising:
verifying a pseudonym revocation verification parameter of the user.

15. A user terminal in a communication system, comprising:
a hardware processor configured to:
acquire a root pseudonym;
acquire one or more resource credentials;
generate a first derived pseudonym from the root pseudonym; and
generate a flexible credential from a selected set of resource credentials,
wherein:
the user terminal acquires access to a set of resources corresponding to the set of resource credentials by using the first derived pseudonym and the flexible credential,
the hardware processor further configured to generate a second derived pseudonym from the root pseudonym, and acquire a resource credential by using the second derived pseudonym,
$T=t^\tau$ is calculated as the second derived pseudonym, where t is the root pseudonym and $\tau$ is an integer, and the hardware processor is further configured to acquire a credential information $v_{ij}'$, and stores $v_{ij}=v_{ij}'^{1/\tau}$ as the resource credential.

16. A user terminal in a communication system, comprising:
a hardware processor configured to:
acquire a root pseudonym;
acquire one or more resource credentials;
generate a first derived pseudonym from the root pseudonym; and
generate a flexible credential from a selected set of resource credentials,
wherein:
the user terminal acquires access to a set of resources corresponding to the set of resource credentials by using the first derived pseudonym and the flexible credential,
the hardware processor is configured to calculate $T'=t^{\tau'}$ as the first derived pseudonym, where t is the root pseudonym and $\tau'$ is an integer, and wherein the hardware processor is configured to calculate $$V = \left(\bigodot_{j=1}^{\lambda} u_j\right)^{t'} \text{ or } V = t'\left(\sum_{j=1}^{\lambda} u_j\right)$$

as the flexible credential, where $u_j$ is the set of resource credentials, j=1, ..., n'.

17. The user terminal according to claim 16, wherein the hardware processor is further configured to:
update a credential revocation parameter for a resource according to a revocation list for the resource, and
generate a credential revocation verification parameter from the credential revocation parameter.

18. The user terminal according to claim 16, wherein the hardware processor is further configured to acquire a resource credential by using the root pseudonym.

19. The user terminal according to claim 16, wherein the hardware processor is further configured to generate a tracing parameter from a user-unique parameter, wherein the tracing parameter may be used in connection with the root pseudonym or a derived pseudonym generated from the root pseudonym for tracing the identity of the user.

20. The user terminal according to claim 16, wherein the hardware processor is further configured to acquire a pseudonym revocation parameter which may be used to revoke the root pseudonym and any derived pseudonym generated from the root pseudonym, and wherein the hardware processor is further configured to generate from the pseudonym revocation parameter a pseudonym revocation verification parameter which is used in connection with a derived pseudonym.

21. A method for a user terminal in a communication system, comprising:
performing using a hardware processor:
acquiring a root pseudonym;
acquiring one or more resource credentials;
generating a first derived pseudonym from the root pseudonym, and generating a flexible credential from a selected set of resource credentials; and
acquiring access to a set of resources corresponding to the set of resource credentials by using the first derived pseudonym and the flexible credential,
wherein acquiring one or more resource credentials comprises generating a second derived pseudonym from the root pseudonym, and acquiring a resource credential by using the second derived pseudonym, and
wherein the second derived pseudonym is calculated as $T=t^{\tau}$, where t is the root pseudonym and $\tau$ is an integer, and wherein acquiring one or more resource credentials comprises acquiring a credential information $v_{ij}'$, and stores $v_{ij}=v_{ij}'^{1/\tau}$ as a resource credential.

22. A method for a user terminal in a communication system, comprising:
performing using a hardware processor:
acquiring a root pseudonym;
acquiring one or more resource credentials;
generating a first derived pseudonym from the root pseudonym, and generating a flexible credential from a selected set of resource credentials; and
acquiring access to a set of resources corresponding to the set of resource credentials by using the first derived pseudonym and the flexible credential,
wherein the first derived pseudonym is calculated as $T'=t^{\tau'}$, where t is the root pseudonym and $\tau'$ is an integer, and wherein the flexible credential is calculated as $$V = \left(\bigodot_{j=1}^{\lambda} u_j\right)^{t'} \text{ or } V = t'\left(\sum_{j=1}^{\lambda} u_j\right),$$

where $u_j$ is the set of resource credentials, j=1, ..., n'.

23. The method according to claim 22, further comprising:
updating a credential revocation parameter for a resource according to a revocation list for the resource; and
generating a credential revocation verification parameter from the credential revocation parameter.

24. The method according to claim 22, wherein acquiring one or more resource credentials comprises acquiring a resource credential by using the root pseudonym.

25. The method according to claim 22, further comprising:
generating a tracing parameter from a user-unique parameter, wherein the tracing parameter may be used in connection with the root pseudonym or a derived pseudonym generated from the root pseudonym for tracing the identity of the user.

26. The method according to claim 22, further comprising:
acquiring a pseudonym revocation parameter which may be used to revoke the root pseudonym and any derived pseudonym generated from the root pseudonym; and
generating from the pseudonym revocation parameter a pseudonym revocation verification parameter which is used in connection with a derived pseudonym.

27. An apparatus for managing accesses to one or more resource in a communication system, comprising:
a hardware processor configured to:
verify a derived pseudonym of a user;
verify a flexible credential of the user; and
authorize the user to access a set of resources corresponding to the flexible credential based on the verification of the derived pseudonym and the flexible credential,
wherein:
the derived pseudonym is calculated as $T'=t^{\tau'}$, where t is a root pseudonym and $\tau'$ is an integer, and the flexible credential is calculated as $$V = \left(\bigodot_{j=1}^{\lambda} u_j\right)^{t'} \text{ or } V = t'\left(\sum_{j=1}^{\lambda} u_j\right),$$

where $u_j$ is a set of resource credentials, j=1, ..., n'.

28. The apparatus according to claim 27, wherein the hardware processor is further configured to acquire a revocation list for the resource.

29. The apparatus according to claim 28, wherein the hardware processor is further configured to verify a credential revocation verification parameter of the user based on the parameters in the revocation list.

30. The apparatus according to claim 27, wherein the hardware processor is further configured to verify a pseudonym revocation verification parameter of the user.

31. A method for managing accesses to one or more resource in a communication system, comprising:
performing using a hardware processor:
verifying a derived pseudonym of a user;
verifying a flexible credential of the user; and
authorizing the user to access a set of resources corresponding to the flexible credential based on the results of the verifications of the derived pseudonym and the flexible credential,
wherein:
the derived pseudonym is calculated as $T'=t^{\tau'}$, where t is a root pseudonym and $\tau'$ is an integer, and the flexible credential is calculated as $$V = \left(\bigodot_{j=1}^{\hat{a}} u_j\right)^{t'} \text{ or } V = t'\left(\sum_{j=1}^{\hat{a}} u_j\right),$$

where $u_j$ is a set of resource credentials, j=1, ..., n'.

32. The method according to claim 31, further comprising:
acquiring a revocation list for the resource.

33. The method according to claim 32, wherein verifying a derived pseudonym of a user further comprises verifying a credential revocation verification parameter of the user based on the parameters in the revocation list for the resource.

34. The method according to claim 31, wherein verifying a derived pseudonym of a user further comprises verifying a pseudonym revocation verification parameter of the user.

* * * * *

UNITED STATES PATENT AND TRADEMARK OFFICE
CERTIFICATE OF CORRECTION

PATENT NO. : 8,327,423 B2
APPLICATION NO. : 12/147057
DATED : December 4, 2012
INVENTOR(S) : Ke Zeng It is certified that error appears in the above-identified patent and that said Letters Patent is hereby corrected as shown below:

In the Specification

Column 10, Line 32: Delete "$v_{ij}^1=$" and insert -- $v_{ij}'=$ --

Column 10, Line 46: Delete "arch" and insert -- are --

Column 11, Line 7: Delete "$\hat{R} \epsilon R$" and insert -- $\hat{R} \subseteq R$ --

Column 11, Line 10: Delete "$\hat{B} \epsilon B$" and insert -- $\hat{B} \subseteq B$ --

Column 11, Line 12: Delete "$\hat{A} \epsilon A$" and insert -- $\tilde{A} \subseteq A$ --

Column 11, Line 15: Delete "$\hat{\Lambda}$" and insert -- $\hat{\Lambda} =$ --

Column 11, Line 31: Delete "$\tilde{\Lambda}$" and insert -- $\hat{\Lambda} =$ --

Column 13, Line 31: Delete "$G_1^2 \, 1^2$" and insert -- $G_1^2$ --

Column 13, Line 59: Delete "1002" and insert -- S1002 --

Column 16, Line 31: After "send" insert -- { --

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,327,423 B2

Column 16, Line 64: Delete "$\tilde{\omega}_{ij}^{1+z} = g_{1i}^{j\,1/(a+z)} = \tilde{g}_{1i}^{j}$" and insert -- $\tilde{w}_{ij}^{a+s} = g_{1i}^{j\,1/(a+s)} = \tilde{g}_{1i}^{j}$. --

Column 17, line 38: Delete

"$\Sigma = SKP\{(x_1, x_2): e(\mathcal{G}_1, \mathcal{G}_2)^{x1} \cdot (e(t^{-1}, \mathcal{G}_2)^\tau)^{x2} \wedge e(W, A)$" and insert -- $\Sigma = SKP\{(x_1, x_2): e(T, A) = e(g_1 \cdot g_2)^{x_1} \cdot (e(t^{-1}, g_2)^\tau)^{x_2} \wedge e(W, A)$ --

Column 17, Line 62: Delete

"$\Sigma = SKP\{(x_1, x_2): e(T, A) = e(g_1, g_2)^{x_1} \cdot (e(t^{-1}, g_2)^\tau)^{x_2} \wedge e(W, A) = e(g_k^t g_1^m, g_2)^{x_1} \cdot (e((w_k w_m)^{-1}, g_2)^\tau)^{x_2}\}$" and insert -- $\Sigma = SKP\{(x_1, x_2): e(T, A) = e(\mathcal{G}_1, \mathcal{G}_2)^{x1} \cdot (e(t^{-1}, \mathcal{G}_2)^\tau)^{x2} \wedge e(W, A) = e(\mathcal{G}_1^k \mathcal{G}_1^m, \mathcal{G}_2)^{x1} \cdot (e((\omega_k \omega_m)^{-1}, \mathcal{G}_2)^\tau)^{x2}\}$ --